(12) United States Patent
Otsuka

(10) Patent No.: US 9,310,764 B2
(45) Date of Patent: Apr. 12, 2016

(54) IMAGE FORMING APPARATUS

(71) Applicant: CANON KABUSHIKI KAISHA, Tokyo (JP)

(72) Inventor: Yuya Otsuka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/549,897

(22) Filed: Nov. 21, 2014

(65) Prior Publication Data
US 2015/0153710 A1    Jun. 4, 2015

(30) Foreign Application Priority Data

Nov. 29, 2013   (JP) ................................ 2013-247039
Nov. 29, 2013   (JP) ................................ 2013-247040

(51) Int. Cl.
| | |
|---|---|
| G03G 21/20 | (2006.01) |
| H04N 1/00 | (2006.01) |
| G03G 15/02 | (2006.01) |
| G03G 15/10 | (2006.01) |
| G03G 15/08 | (2006.01) |

(52) U.S. Cl.
CPC ......... *G03G 21/206* (2013.01); *H04N 1/00981* (2013.01); *G03G 15/0258* (2013.01); *G03G 15/0898* (2013.01); *G03G 15/107* (2013.01); *G03G 21/20* (2013.01); *G03G 2221/1696* (2013.01)

(58) Field of Classification Search
CPC ..................................................... G03G 21/20
USPC .............................................................. 399/92
See application file for complete search history.

(56) References Cited

U.S. PATENT DOCUMENTS

| | | | | |
|---|---|---|---|---|
| 7,706,712 B2 * | 4/2010 | Shuto | ............................... | 399/92 |
| 7,835,660 B2 * | 11/2010 | Suzuki | ............................ | 399/92 |
| 7,856,193 B2 * | 12/2010 | Kawamata | ...................... | 399/92 |
| 8,270,866 B2 | 9/2012 | Nishikawa | | |

(Continued)

FOREIGN PATENT DOCUMENTS

| | | |
|---|---|---|
| JP | 9-237027 A | 9/1997 |
| JP | 2004-284713 A | 10/2004 |

(Continued)

OTHER PUBLICATIONS

Japanese Office Action dated Jul. 28, 2015, in counterpart Japanese Patent Application No. 2013-247039.

(Continued)

*Primary Examiner* — Clayton E Laballe
*Assistant Examiner* — Kevin Butler
(74) *Attorney, Agent, or Firm* — Fitzpatrick, Cella, Harper & Scinto

(57) ABSTRACT

An image forming apparatus includes: an image forming portion; a first housing; a fixing device; a second housing; a first opening of the first housing facing a space; a second opening of the second housing facing the space; a first air supply fan that supplies air from the outside; a first air discharge fan that discharges air from the inside; a second air supply fan that supplies air from the outside; and a second air discharge fan that discharges air from the inside. The first housing and the second housing communicate with the atmosphere through the first and second openings, respectively. When the air pressure in the first opening of the first housing is P1 and the air pressure in the second opening of the second housing is P2, a relation of P2<P1 is satisfied.

34 Claims, 10 Drawing Sheets

(56) References Cited

U.S. PATENT DOCUMENTS

| | | | |
|---|---|---|---|
| 8,498,549 B2* | 7/2013 | Nishikawa | 399/92 |
| 2007/0009283 A1* | 1/2007 | Shirakata et al. | 399/92 |
| 2008/0050145 A1* | 2/2008 | Hanano | 399/93 |
| 2011/0116826 A1* | 5/2011 | Nishikawa | 399/92 |
| 2012/0301175 A1* | 11/2012 | Nishikawa | 399/92 |

FOREIGN PATENT DOCUMENTS

| | | |
|---|---|---|
| JP | 2005-292564 A | 10/2005 |
| JP | 2006-17999 A | 1/2006 |
| JP | 2007-25654 A | 2/2007 |
| JP | 2011-107387 A | 6/2011 |
| JP | 4731825 B2 | 7/2011 |
| JP | 5064726 B2 | 10/2012 |
| JP | 5359805 B2 | 12/2013 |

OTHER PUBLICATIONS

Japanese Office Action dated Aug. 4, 2015, in counterpart Japanese Patent Application No. 2013-247040.

Japanese Office Action dated Feb. 16, 2016, in counterpart Japanese Patent Application No. 2013-247039.

* cited by examiner

IMAGE FORMING APPARATUS

BACKGROUND OF THE INVENTION

1. Field of the Invention

The present invention relates to an image forming apparatus.

2. Description of the Related Art

Japanese Patent Laid-Open No. 9-237027 discloses an image forming apparatus in which an image forming chamber in which a photosensitive drum and an exposure device are disposed is separated from a heat-fixing chamber by a partition plate. In this image forming apparatus, a fan provided in the partition plate rotates in normal and reverse directions. For example, when the temperature in the image forming chamber is lower than a desired temperature, air heated in the heat-fixing chamber is supplied to the image forming chamber. When the temperature in the image forming chamber is higher than a desired temperature, air heated in the image forming chamber is supplied to the heat-fixing chamber. As a result, the temperature of air inside the image forming chamber is maintained to a desired temperature.

However, even when the image forming chamber and the heat-fixing chamber are divided by the partition plate, it is necessary to convey a recording material from the image forming chamber to the heat-fixing chamber in order to heat-fix a recording material in which an image is not fixed. Thus, an opening through which the recording material is delivered needs to be formed in the partition plate.

Sine the opening is present, hot air moved from the image forming chamber to the heat-fixing chamber may be further heated in the heat-fixing chamber and may return to the image forming chamber through the opening of the partition plate. As a result, the temperature in the image forming chamber may increase so that electrical characteristics of respective components may change and a large displacement between components may occur with a change in the temperature of the environment where the image forming apparatus is used.

Moreover, the hot air in the heat-fixing chamber may enter the image forming chamber when the opening of the image forming chamber is very close to the opening of the heat-fixing chamber or depending on a pressure relation near the openings.

SUMMARY OF THE INVENTION

It is desirable to provide an image forming apparatus in which a first housing having an image forming portion is disposed to be adjacent to a second housing having a fixing device and which reduces a heat quantity of air flowing from the second housing to the first housing to suppress an increase in the temperature of components inside the first housing.

The image forming apparatus includes: an image forming portion that forms an image on a recording material; a first housing that covers the image forming portion; a fixing device that fixes the image formed on the recording material; a second housing that is disposed to face the first housing at outward of the first housing so as to cover the fixing device; a first opening formed in the first housing in order to convey the recording material from the first housing to the second housing; a second opening formed in the second housing so as to face the first opening in order to convey the recording material from the first housing to the second housing; a first air supply and discharge device including at least one of a first air supply device that is provided in the first housing so as to supply air into the first housing from the outside and a first air discharge device that is provided in the first housing so as to discharge air from an inside of the first housing to the outside; and a second air supply and discharge device including at least one of a second air supply device that is provided in the second housing so as to supply air into the second housing from the outside and a second air discharge device that is provided in the second housing so as to discharge air from an inside of the second housing to the outside, wherein the first housing and the second housing communicate with the atmosphere through the first and second openings, respectively, and when an absolute pressure of a wind pressure of air in the first opening of the first housing is P1 [Pa (abs)] and an absolute pressure of a wind pressure of air in the second opening of the second housing is P2 [Pa (abs)], a relation of P2<P1 is satisfied at least during an image forming operation.

Further features of the present invention will become apparent from the following description of exemplary embodiments with reference to the attached drawings.

DESCRIPTION OF THE EMBODIMENTS

First Embodiment

Forming and Fixing of Image on Recording Material

Figure 1:
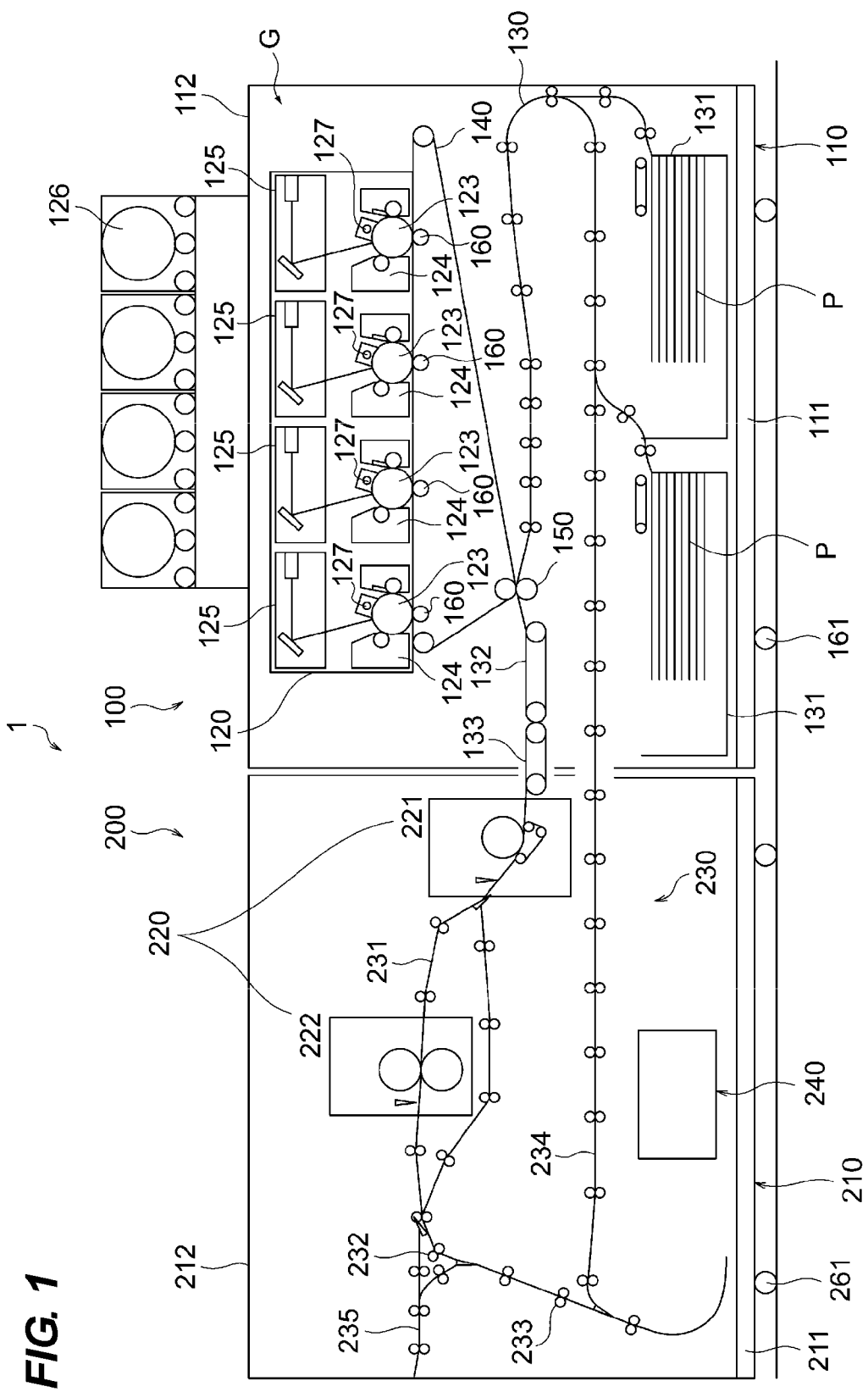
FIG. 1 is a cross-sectional view of an image forming apparatus according to a first embodiment of the present invention.

FIG. 1 is a cross-sectional view schematically illustrating a schematic configuration of an image forming apparatus 1 obtained by combining a first housing unit 100 and a second housing unit 200 according to the present invention. The image forming apparatus 1 is configured so as to be divided into the first housing unit 100 and the second housing unit 200 in order to enhance convenience for accommodating and installing the same in the user's place.

The first housing unit 100 includes a first housing 110, an image forming portion G for forming an image, and a first conveying portion 130 that conveys a recording material P in the first housing unit 100. The first housing 110 includes a first frame body 111 and a first outer casing portion 112. The image forming portion G that forms an image on the recording material P includes an image forming station 120, an intermediate transfer member 140, and a transferring portion 150. The image forming portion G is covered with the first housing 110. Moreover, the image forming portion G, the first conveying portion 130, and the first outer casing portion 112 are supported by the first frame body 111.

The second housing unit 200 includes a second housing 210, a fixing device 220 that fixes a non-fixed image formed on the recording material P, and a second conveying portion 230 that conveys the recording material P in the second housing unit 200. The second housing 210 is disposed to face the first housing at outward of the first housing 110 so as to cover the fixing device 220. The second housing 210 includes a second frame body 211 and a second outer casing portion 212. The fixing device 220 includes a first fixing device 221 and a second fixing device 222. The fixing device 220 and the second conveying portion 230 are arranged inside the second housing 210. Moreover, the fixing device 220, the second conveying portion 230, and the second outer casing portion 212 are supported by the second frame body 211.

In the image forming apparatus according to this embodiment, a plurality of (four) image forming stations 120 is arranged in a moving direction of the intermediate transfer member 140 so as to accelerate an image forming operation. One of the plurality of image forming stations 120 will be described in detail, and the individual image forming stations 120 have the same configuration.

The image forming station 120 disposed in the first housing 110 includes a photosensitive drum 123 (electrophotographic photosensitive drum), a charging device 127, an exposure portion 125, a developing device 124, and transferring portions 150 and 160. The photosensitive drum 123 is a drum around which a photosensitive material is disposed. The charging device 127 is a device that charges the surface of the photosensitive drum 123 to a desired potential level. The exposure portion 125 is a portion that exposes the surface of the photosensitive drum 123 charged by the charging device 127 to form an electrostatic image.

The developing device 124 is a device that develops the electrostatic image on the surface of the photosensitive drum 123 with toner as developer to form a developer image. The transferring portion 160 (primary transferring portion) is a portion that transfers the developer image formed on the surface of the photosensitive drum 123 to the intermediate transfer member 140. Moreover, the transferring portion 150 (secondary transferring portion) is a portion that transfers the developer image transferred to the intermediate transfer member 140 to the recording material P (sheet or recording material formed of a resin represented by OHP) conveyed by the first conveying portion 130. A hopper portion 126 is disposed above the first housing 110. The hopper portion 126 is a container that stores developer to be supplied to the developing device 124.

A recording material supply portion 131 supplies the recording material P. A first belt conveying portion 132 conveys the transferred recording material P toward the second housing unit 200. A second belt conveying portion 133 conveys the recording material P carrying a non-fixed image, transferred from the first housing unit 100 toward the second housing unit 200.

The fixing device 220 is disposed inside the second housing 210. The fixing device 220 fixes the image formed on the recording material P. The fixing device 220 includes the first fixing device 221 and the second fixing device 222. The first fixing device 221 is a device that fixes a developer image to the recording material P to which a developer image is transferred inside the first housing unit 100 with respect to the recording material P. The first fixing device 221 has a pair of rollers having heaters (not illustrated) and fixes the non-fixed developer image on the recording material P by heat and pressure. A conveying path 231 is disposed between the first fixing device 221 and the second fixing device 222 so as to connect them.

The second fixing device 222 is a device for controlling gloss of the recording material P to which a developer image is fixed to enhance the image quality. The second fixing device 222 has a pair of rollers having heaters (not illustrated) and further fixes the fixed image on the recording material P by heat and pressure.

A resupply conveying path 232 is a passage through which the recording material P is conveyed and guided to the image forming portion G again when an image is formed on both sides of the recording material P. A reversal path 233 is a passage through which the recording material P resupplied by the resupply conveying path 232 is reversed. A duplex path 234 is a passage through which the recording material P reversed by the reversal path 233 is conveyed up to the developing device 124.

The first conveying portion 130, the first belt conveying portion 132, the second belt conveying portion 133, and the conveying path 231 correspond to a conveying portion for conveying the recording material P from the first housing 110 to the second housing 210. In particular, the second belt conveying portion 133 corresponds to the conveying portion of the present invention. Moreover, the duplex path 234, a sheet discharge path 235, and the like correspond to a conveying portion for conveying the recording material P from the second housing 210 to the first housing 110. In particular, the duplex path 234 corresponds to the conveying portion of the present invention.

A bottle 240 is a container that stores toner collected from the developing device 124, the photosensitive drum 123, and a cleaning device that cleans the intermediate transfer member 140. The printed recording material P is discharged outside the apparatus through the sheet discharge path 235. A caster 161 is coupled to the first frame body 111 so as to support the first housing unit 100. A caster 261 is coupled to the second frame body 211 so as to support the second housing unit 200.

External View of Combined State of Image Forming Apparatus

Figure 2:
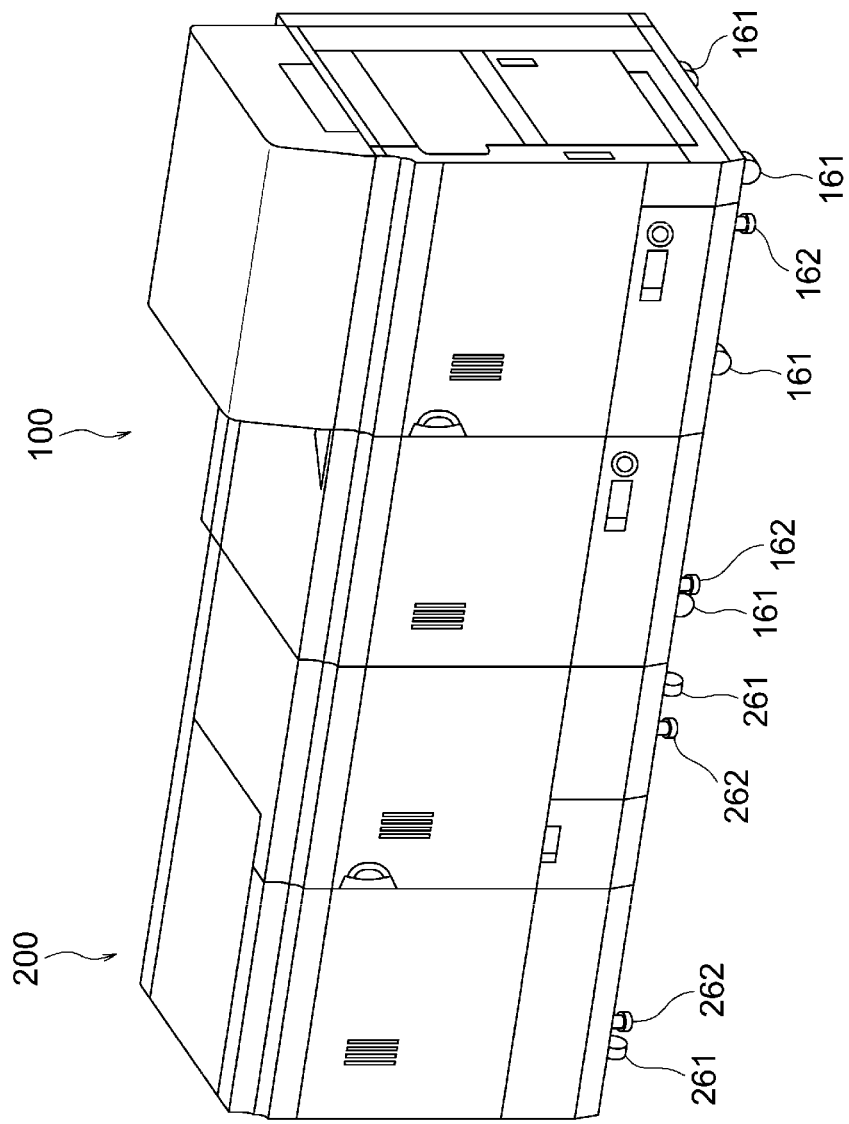
FIG. 2 is a perspective view of the image forming apparatus.

FIG. 2 is a perspective view illustrating an external view of the image forming apparatus according to this example in a state where the first housing unit 100 and the second housing unit 200 are combined. The first housing unit 100 is in contact with the ground with the first caster 161 and a first adjuster 162 interposed, provided in the first frame body 111. The second housing unit 200 is in contact with the ground with the caster 261 and an adjuster 262 interposed, provided in the second frame body 211.

The first housing unit 100 and the second housing unit 200 are configured such that the height positions can be aligned by adjusting the first adjuster 162 and the second adjuster 262. Moreover, the first housing unit 100 and the second housing unit 200 are configured such that the horizontal positions can be aligned by positioning pins (not illustrated) and the respective units are fixed by fixing members (not illustrated).

External View of First and Second Housing Units

Figure 3A:
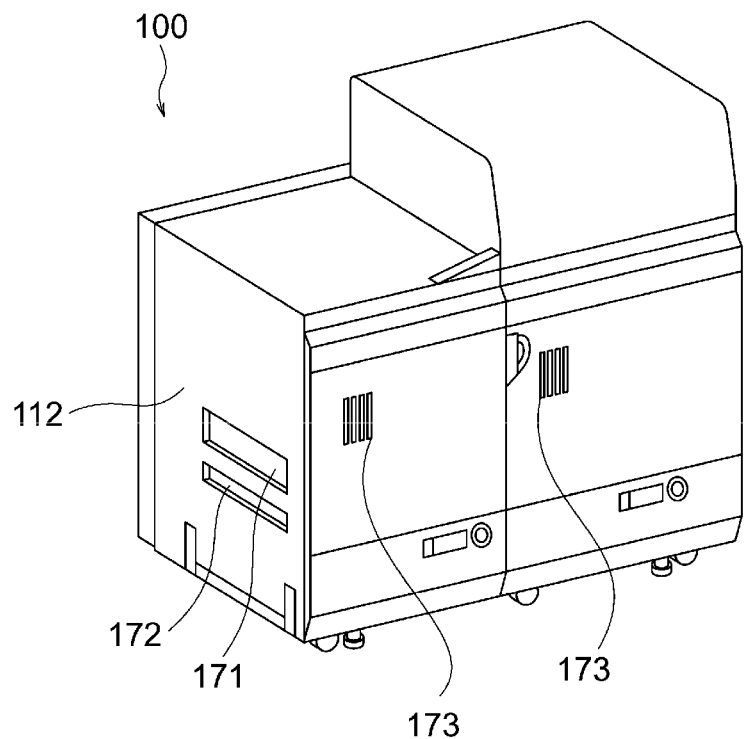
FIGS. 3A and 3B are perspective views of a first housing unit.
Figure 3B:
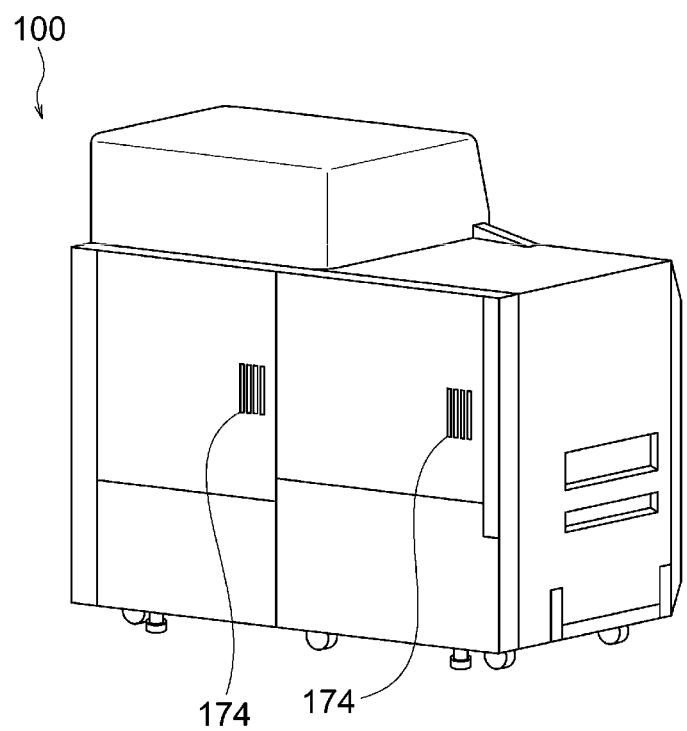

FIGS. 3A and 3B are perspective views illustrating an external view of the first housing unit 100, in which FIG. 3A is a front view and FIG. 3B is a rear view. A first upper-side opening 171 for delivering the recording material P to the second housing unit 200 is formed in an upper portion of the left side surface of the first outer casing portion 112. Moreover, a first lower-side opening 172 for receiving the recording material P from the second housing unit 200 is formed in a lower portion of the left side surface of the first outer casing portion 112.

A first front-side opening 173 and a first rear-side opening 174 are formed in the front surface and the rear surface of the first outer casing portion 112 so as to take the outside air of the image forming apparatus 1 into the first housing 110 or to discharge air inside the first housing 110. Moreover, a fan (not illustrated) may be used as necessary to exchange the air inside and outside the first housing 110.

Figure 4A:
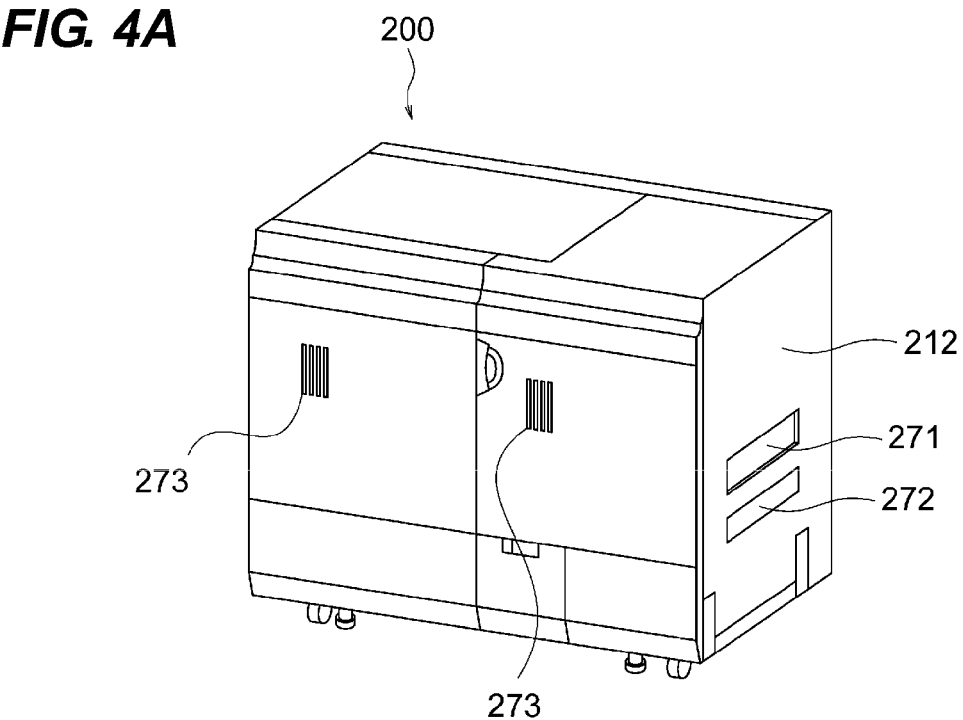
FIGS. 4A and 4B are perspective views of a second housing unit.
Figure 4B:
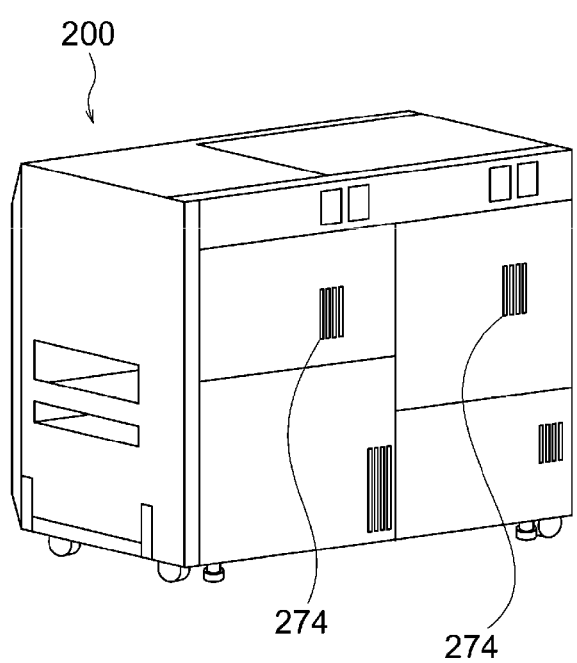

FIGS. 4A and 4B are perspective views illustrating an external view of the second housing unit 200, in which FIG. 4A is a front view and FIG. 4B is a rear view. A second upper-side opening 271 for receiving the recording material P from the first housing unit 100 is formed in an upper portion of the right side surface of the second outer casing portion 212. Moreover, a second lower-side opening 272 for delivering the recording material P to the first housing unit 100 is formed in a lower portion of the right side surface of the second outer casing portion 212.

A second front-side opening 273 and a second rear-side opening 274 are formed in the front surface and the rear surface of the second outer casing portion 212 so as to take the outside air of the image forming apparatus 1 into the second housing 210 or to discharge the air inside the second housing 210. Moreover, a fan (not illustrated) may be used as necessary so as to exchange the air inside and outside the second housing 210.

The first upper-side opening 171 and the second upper-side opening 271 are provided approximately at the same height and horizontal positions of the facing outer surfaces because the openings are formed so as to convey the recording material P therethrough. Similarly, the first lower-side opening 172 and the second lower-side opening 272 are provided approximately at the same height and horizontal positions of the facing outer surfaces.

Schematic View of Combined State of Image Forming Apparatus

Figure 5:
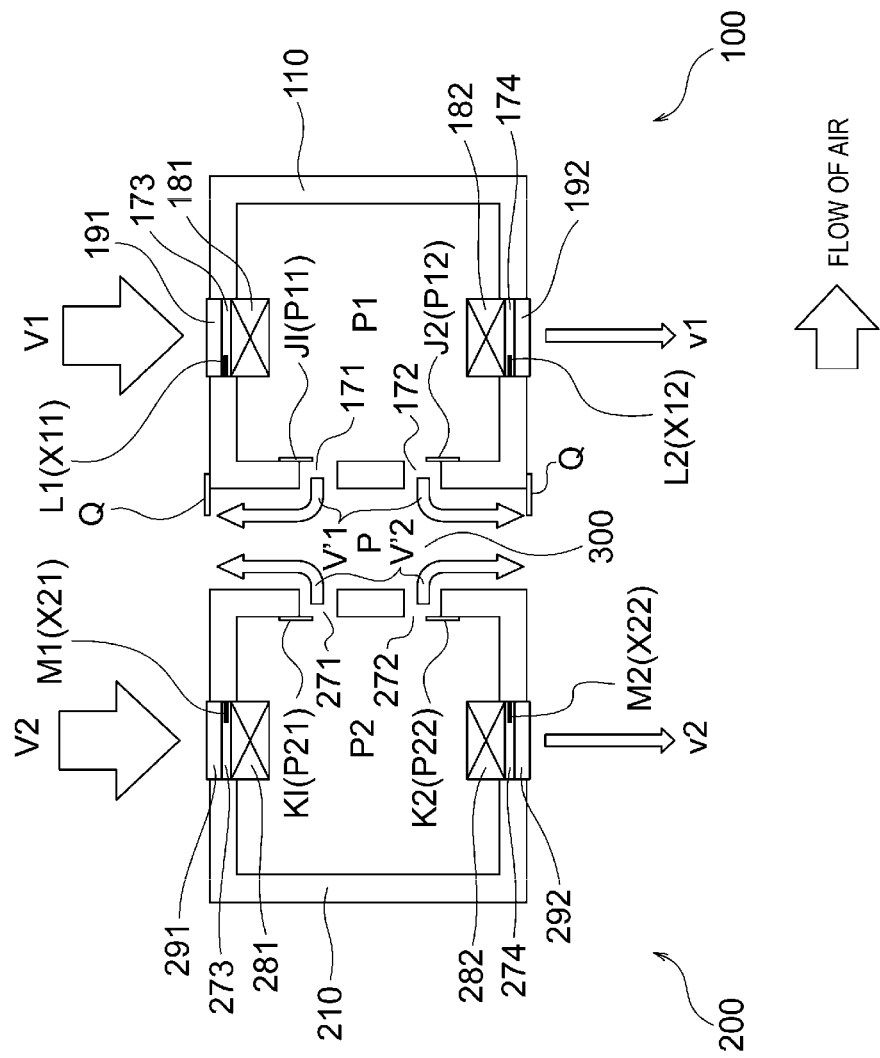
FIG. 5 is a cross-sectional view illustrating steps of cooling the inside of the first and second housing units.

FIG. 5 is a diagram schematically illustrating configurations associated with cooling of the image forming apparatus 1 in which the first housing unit 100 and the second housing unit 200 are combined. The first housing unit 100 and the second housing unit 200 are positioned by positioning pins (not illustrated) at a close distance with a predetermined space 300 interposed and are fixed by a fixing member (not illustrated). The space 300 is formed between the first housing 110 and the second housing 210 and communicates with the atmosphere.

As described above, the first housing 110 isolates the air inside and outside the first housing unit 100. The first upper-side opening 171 and the first lower-side opening 172 as 'first opening' are formed in a surface of the first housing 110 facing the second housing 210 and the space 300. Although two openings are formed in this embodiment, at least one openings may be formed. The first housing 110 can exchange air with the space 300 through the first upper-side opening 171 and the first lower-side opening 172 and exchange air with the outside air of the image forming apparatus 1 through the first front-side opening 173 and the first rear-side opening 174.

A first air supply fan 181 is provided on the inner side of the first front-side opening 173. The first air supply fan 181 as 'first air supply device' (first air supply and discharge device) is provided in the first housing 110 so as to supply air from the outside to the inside of the first housing 110. Pressure [Pa] described hereinafter is a wind pressure or a static pressure and is defined as an absolute pressure based on an absolute vacuum and an atmospheric pressure is defined as P [Pa].

A first air discharge fan 182 is provided on the inner side of the first rear-side opening 174. The first air discharge fan 182 as 'first air discharge device' (first air supply and discharge device) is provided in the first housing 110 so as to discharge air from the inside to the outside of the first housing 110. In this embodiment, although both the first air supply fan 181 and the first air discharge fan 182 are provided, a desired function can be realized as long as at least one of the fans is provided.

A wind pressure can be measured by a wind pressure sensor. Specifically, a wind pressure P1 of air leaking from the inside to the outside of the first opening (171, 172) in the first housing 110 or entering from the outside to the inside of the first opening is measured near the first upper-side opening 171 and the first lower-side opening 172 (which will be described later).

The second housing 210 isolates the air inside and outside the second housing unit 200. The second upper-side opening 271 and the second lower-side opening 272 as 'second opening' are formed in a surface of the second housing 210 facing the first housing 110 and the space 300. Although two openings are formed in this embodiment, at least one openings may be formed. The second housing 210 can exchange air with the space 300 through the second upper-side opening 271 and the second lower-side opening 272 and exchange air with the outside air of the image forming apparatus 1 through the second front-side opening 273 and the second rear-side opening 274.

A second air supply fan 281 is provided in the second front-side opening 273. The second air supply fan 281 as 'second air supply device' (second air supply and discharge device) is provided in the second housing 210 so as to supply air from the outside to the inside of the second housing 210.

A second air discharge fan 282 is provided in the second rear-side opening 274. The second air discharge fan 282 as 'second air discharge device' (second air supply and discharge device) is provided in the second housing 210 so as to discharge air from the inside to the outside of the second housing 210. In this embodiment, although both the second air supply fan 281 and the second air discharge fan 282 are provided, a desired function can be realized as long as at least one of the fans is provided.

A wind pressure P2 of air leaking from the inside to the outside of the second opening (273, 274) in the second housing 210 or entering from the outside to the inside of the second opening is measured near the second upper-side opening 271 and the second lower-side opening 272 (which will be described later).

The first air supply fan 181, the first air discharge fan 182, the second air supply fan 281, and the second air discharge fan 282 supply and discharge air so that a relation of $P1>P2>P$ is satisfied. Moreover, these fans are set to operate constantly during an image forming operation. Specifically, these fans operate when the first fixing device 221 and the second fixing device 222 start operating. When the first fixing device 221 and the second fixing device 222 stop operating, or when a predetermined period elapses after that, these fans stop. Thus, the fans may operate at least during an image forming operation.

A pressure difference inside and outside the housing due to fans is determined by a combination of known factors such as the number of fans, a fan type, a difference in the rotation speed of fan blades, a difference in opening size of air ducts, and a difference in pressure loss in air ducts depending on a difference in the length of air ducts, and can be set as necessary by a designer. Hereinafter, a combination of volumes of supplied and discharged air and the flow of wind will be described.

Case where P1>P and P2>P

FIG. 5 schematically illustrates the flow of wind when P2<P1 and P1>P and P2>P. The flow of air inside and outside the first housing 110 satisfies a relation of P1>P. Thus, a portion of air supplied from the first front-side opening 173 by the first air supply fan 181 is discharged from the first rear-side opening 174 by the first air discharge fan 182, and the remaining air is discharged to the space 300 open to the atmosphere through the first upper-side opening 171 and the first lower-side opening 172.

A wind pressure sensor J1 protrudes downward from the upper side of the first upper-side opening 171. This wind pressure sensor J1 measures a wind pressure P11 of the air in the first upper-side opening 171 leaking from the first upper-side opening 171. A wind pressure sensor J2 protrudes upward from the lower side of the first lower-side opening 172. This wind pressure sensor J2 measures a wind pressure P12 of the air in the first lower-side opening 172 leaking from the first lower-side opening 172. Thus, the wind pressure of the air leaking in the opening inside the first housing 110 is $P1=(P11+P12)/2$.

The flow of air inside the second housing 210 satisfies a relation of P2>P. Thus, a portion of the air supplied from the second front-side opening 273 by the second air supply fan 281 is discharged from the second rear-side opening 274 by the second air discharge fan 282, and the remaining air is discharged to the space 300 open to the atmosphere through the second upper-side opening 271 and the second lower-side opening 272.

A wind pressure sensor K1 protrudes downward from the upper side of the second upper-side opening 271. This wind pressure sensor K1 measures a wind pressure P21 of the air in the second upper-side opening 271 leaking from the second upper-side opening 271. A wind pressure sensor K2 protrudes upward from the lower side of the second lower-side opening 272. This wind pressure sensor K2 measures a wind pressure P22 of the air in the second lower-side opening 272 leaking from the second lower-side opening 272. Thus, the wind pressure of the air leaking in the opening inside the second housing 210 is $P2=(P21+P22)/2$.

Thus, the heated air in the second housing 210 having passed through the first and second fixing devices 221 and 222 heated to high temperature in order to fix images is discharged to the air discharged from the first upper-side opening 171 and the first lower-side opening 172. Moreover, the air is discharged to the outside air through the space 300 and the second rear-side opening 274 without entering into the first housing 110.

Further, in this embodiment, the pressure in the first housing 110 and the pressure in the second housing 210 is set to be higher than the atmospheric pressure. Thus, air may be discharged outside the image forming apparatus 1 through an unexpected gap in the first or second housing 110 or 210, but the outside air of the image forming apparatus 1 may not be taken in. Thus, the first front-side opening 173 on the upstream side of the first air supply fan 181 is the only air introduction port of the first housing 110. Moreover, the second front-side opening 273 on the upstream side of the second air supply fan 281 is the only air introduction port of the second housing 210.

Strictly speaking, the pressure P1 or P2 when air is discharged outside the image forming apparatus 1 from an unexpected gap is the pressure measured near the unexpected gap in the housing. Thus, although the pressure measured near the first upper-side opening 171 and the first lower-side opening 172 may be different from the pressure measured near the second upper-side opening 271 and the second lower-side opening 272, the conditions P1>P and P2>P are satisfied.

Thus, in particular, when the outside air of the image forming apparatus 1 is contaminated with dust, a first dust filter 191 and a second dust filter 291 are provided in the first front-side opening 173 and the second front-side opening 273, respectively. That is, the first dust filter 191 is disposed in the first front-side opening 173 as an air duct of the first air supply fan 181, and the second dust filter 291 is disposed in the second front-side opening 273 as an air duct of the second air supply fan 281. Due to this, it is possible to collect dust in the outside air efficiently and to ideally prevent malfunctioning of the image forming apparatus 1 due to dust.

In this embodiment, the conditions P1>P and P2>P are satisfied, and the same is satisfied even when at least one first air supply fans and at least one second air supply fans are provided and further even when the first air discharge fan or the second air discharge fan is not provided.

Second Embodiment

A case where P2<P1 and P1<P and P2<P will be described as a second embodiment. The same constituent components as those of the first embodiment will be denoted by the same reference numerals, and description thereof will not be provided.

Case where P1<P and P2<P

Figure 6:
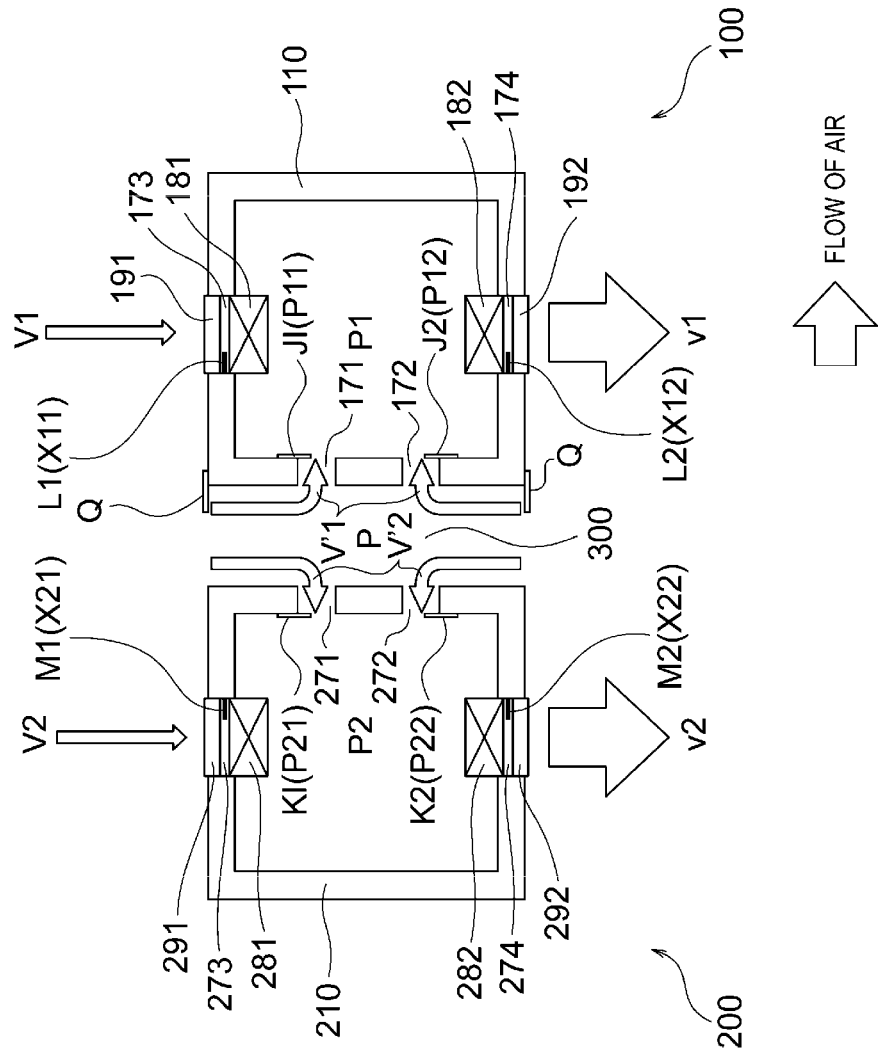
FIG. 6 is a cross-sectional view illustrating steps of cooling the inside of the first and second housing units according to a second embodiment.

FIG. 6 schematically illustrates the volume of air and the flow of wind when P1<P and P2<P.

The air inside and outside the first housing 110 flows in the following manner. Outside air is supplied from the first front-side opening 173 into the first housing 110 by the first air supply fan 181. At the same time, air in the first housing 110 is discharged from the first rear-side opening 174 by the first air discharge fan 182. Further, since P1<P, air is taken in from the space 300 through the first upper-side opening 171 and the first lower-side opening 172, and air in the first housing 110 is discharged from the first rear-side opening 174 by the first air discharge fan 182.

The wind pressure sensor J1 measures the wind pressure P11 of the air in the first upper-side opening 171 entering from the first upper-side opening 171. The wind pressure sensor J2 measures the wind pressure P12 of the air in the first lower-side opening 172 entering from the first lower-side opening 172. Thus, the wind pressure of the air entering in the opening inside the first housing 110 is $P1=(P11+P12)/2$.

The air inside and outside the second housing 210 flows in the following manner. The outside air is supplied from the second front-side opening 273 into the second housing 210 by the second air supply fan 281. At the same time, the air in the second housing 210 is discharged from the second rear-side opening 274 by the second air discharge fan 282. Further, since P2<P, air is taken in from the space 300 through the second upper-side opening 271 and the second lower-side opening 272, and air in the second housing 210 is discharged from the second rear-side opening 274 by the second air discharge fan 282.

The wind pressure sensor K1 measures the wind pressure P21 of the air entering from the second upper-side opening 271. The wind pressure sensor K2 measures the wind pressure P22 of the air entering from the second lower-side opening 272. Thus, the wind pressure of the air entering in the opening inside the second housing 210 is P2=(P21+P22)/2.

The first air supply fan 181, the first air discharge fan 182, the second air supply fan 281, and the second air discharge fan 282 supply and discharge air so that a relation of P2<P is satisfied.

As described above, the heated air in the second housing 210 having passed through the first and second fixing devices 221 and 222 heated to high temperature in order to fix images is discharged to the outside air through the second rear-side opening 274 without entering into the first housing 110.

In this configuration, since the pressure is set so that relations of P1<P and P2<P are satisfied, the outside air of the image forming apparatus 1 may be taken in through an unexpected gap in the first or second housing 110 or 210, but no air is discharged outside the image forming apparatus 1. Thus, an air discharge port of the first housing 110 is limited to the first rear-side opening 174. Moreover, the second rear-side opening 274 is the only air discharge port of the second housing 210.

Strictly speaking, the pressure P1 or P2 when the outside air of the image forming apparatus 1 is taken in from an unexpected gap is the pressure measured near the unexpected gap in the housing. Thus, although the pressure measured near the first upper-side opening 171 and the first lower-side opening 172 may be different from the pressure measured near the second upper-side opening 271 and the second lower-side opening 272, the conditions P1<P and P2<P are satisfied.

In this embodiment, the volumes of air in the second air supply fan 281 and the second air discharge fan 282 inside the second housing 210 are adjusted so that air in the second housing 210 flows outside the second housing 210 through the second upper-side opening 271 and the second lower-side opening 272. That is, the volume of air supplied by the second air supply fan 281 per unit time is smaller than the volume of air discharged by the second air discharge fan 282 so that a relation that a negative pressure is created in the second housing is satisfied. If this relation is satisfied, the air heated in the second housing 210 can rarely flow into the first housing 110.

When VOC, ozone, or the like is generated in the process of image formation and image fixing inside the first and second housings, a first VOC filter 192 and a second VOC filter 292 are provided in the first rear-side opening 174 and the second rear-side opening 274, respectively. That is, the first VOC filter 192 is disposed in the first rear-side opening 174 as an air duct of the first air discharge fan 182, and the second VOC filter 292 is disposed in the second rear-side opening 274 as an air duct of the second air discharge fan 282. Due to this, the air inside the image forming apparatus can be purified efficiently and be discharged outside the apparatus.

In this embodiment, the conditions P1<P and P2<P are satisfied, and the same is satisfied even when the first air supply fan or the second air supply fan is not provided and further even when at least one first air discharge fans and at least one second air discharge fans are provided.

Third Embodiment

Hereinafter, a case where P1>P and P2<P will be described as a third embodiment. The same constituent components as those of the first embodiment will be denoted by the same reference numerals, and description thereof will not be provided.

Case where P1>P and P2<P

Figure 7:
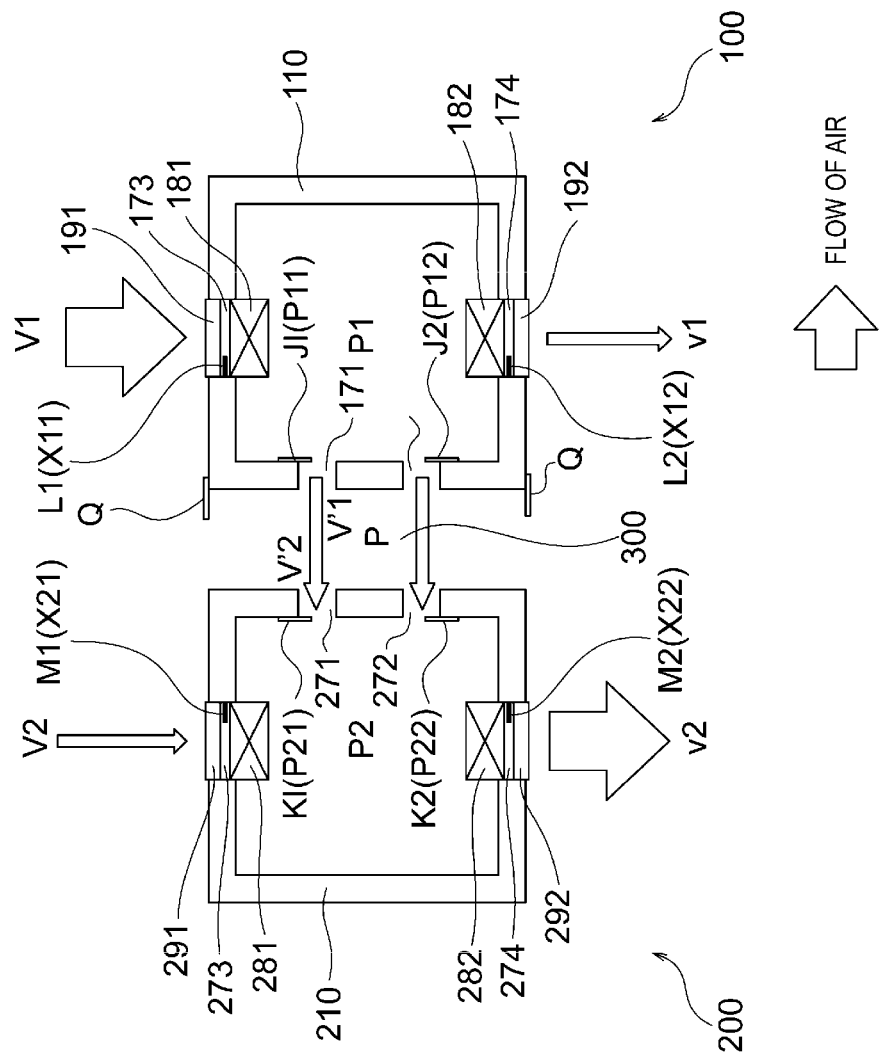
FIG. 7 is a cross-sectional view illustrating steps of cooling the inside of the first and second housing units according to a third embodiment.

FIG. 7 schematically illustrates the volume of air and the flow of wind when P1>P and P2<P.

The flow of air inside and outside of the first housing 110 satisfies a relation of P1>P. Thus, a portion of air supplied from the first front-side opening 173 by the first air supply fan 181 is discharged from the first rear-side opening 174 by the first air discharge fan 182, and the remaining air is discharged to the space 300 open to the atmosphere through the first upper-side opening 171 and the first lower-side opening 172.

The wind pressure sensor J1 measures the wind pressure P11 of the air in the first upper-side opening 171 leaking from the first upper-side opening 171. The wind pressure sensor J2 measures the wind pressure P12 of the air in the first lower-side opening 172 leaking from the first lower-side opening 172. Thus, the wind pressure of the air leaking in the opening inside the first housing 110 is P1=(P11+P12)/2.

The air inside and outside the second housing 210 flows in the following manner. The outside air is supplied from the second front-side opening 273 into the second housing 210 by the second air supply fan 281. At the same time, the air in the second housing 210 is discharged from the second rear-side opening 274 by the second air discharge fan 282. Further, since P2<P, air is taken in from the space 300 through the second upper-side opening 271 and the second lower-side opening 272 and the air in the second housing 210 is discharged from the second rear-side opening 274 by the second air discharge fan 282.

The wind pressure sensor K1 measures the wind pressure P21 of the air in the second upper-side opening 271 entering from the second upper-side opening 271. The wind pressure sensor K2 measures the wind pressure P22 of the air in the second lower-side opening 272 entering from the second lower-side opening 272. Thus, the wind pressure of the air entering into the opening inside the second housing 210 is P2=(P21+P22)/2.

The first air supply fan 181, the first air discharge fan 182, the second air supply fan 281, and the second air discharge fan 282 supply and discharge air so that a relation of P2<P is satisfied.

As described above, the heated air in the second housing 210 having passed through the first and second fixing devices 221 and 222 heated to high temperature in order to fix images is discharged to the outside air through the second rear-side opening 274 without entering into the first housing 110.

Further, in this configuration, the first front-side opening 173 is the only air introduction port of the first housing 110. Thus, in particular, when the outside air of the image forming apparatus 1 is contaminated with dust, the first dust filter 191 is provided in the first front-side opening 173 as an air duct of the first air supply fan 181. Due to this, it is possible to collect dust in the outside air efficiently. Moreover, it is possible to ideally prevent malfunctioning of an exposure portion or the like in the first housing 110, which can easily be affected by dust.

Further, in this configuration, the second rear-side opening 274 is the only air discharge port of the second housing 210. Thus, the second VOC filter 292 is disposed in the second rear-side opening 274 as an air duct of the second air discharge fan 282. Due to this, VOC and the like which are often generated near a hot fixing device, in particular, within the air discharged from the second housing 210 can be purified efficiently and be discharged outside the apparatus.

In this embodiment, the conditions P1>P and P2<P are satisfied, and the same is satisfied even when at least one first air supply fans are provided and the second air supply fan is not provided and further even when the first air discharge fan is not provided and at least one second air discharge fans are provided.

Fourth Embodiment

Hereinafter, a fourth embodiment will be described. The same constituent components as those of the first embodiment will be denoted by the same reference numerals, and description thereof will not be provided.

The first air supply fan 181 is provided on the inner side of the first front-side opening 173 so as to supply the outside air of the image forming apparatus 1 into the first housing 110 with a volume of air V1 [m$^3$/min]. The first air discharge fan 182 is provided on the inner side of the first rear-side opening 174 so as to discharge the air inside the first housing 110 to the outside of the image forming apparatus 1 with a volume of air v1 [m$^3$/min].

The first housing 110 can exchange air with the outside air of the image forming apparatus 1 through the first front-side opening 173 and the first rear-side opening 174. Moreover, although the first housing 110 isolates the inside air from the outside air, the first housing 110 can exchange air with the space 300 through the first upper-side opening 171 and the first lower-side opening 172.

A wind velocity sensor L1 protrudes rightward from the left side of the first front-side opening 173. This wind velocity sensor L1 measures a wind velocity X11 of the air supplied from the first front-side opening 173. If the cross-sectional area of the first front-side opening 173 is Y11, the volume of air supplied from the first front-side opening 173 is V1=X11×Y11.

A wind velocity sensor L2 protrudes rightward from the left side of the first rear-side opening 174. This wind velocity sensor L2 measures a wind velocity X12 of the air discharged from the first rear-side opening 174. If the cross-sectional area of the first rear-side opening 174 is Y12, the volume of air discharged from the first rear-side opening 174 is v1=X12×Y12.

The second air supply fan 281 is provided on the inner side of the second front-side opening 273 so as to supply the outside air of the image forming apparatus 1 into the second housing 210 with a volume of air V2 [m$^3$/min]. The second air discharge fan 282 is provided on the inner side of the second rear-side opening 274 so as to discharge air inside the second housing 210 to the outside of the image forming apparatus 1 with a volume of air v2 [m$^3$/min].

The second housing 210 can exchange air with the outside air of the image forming apparatus 1 through the second front-side opening 273 and the second rear-side opening 274. Moreover, although the second housing 210 isolates the inside air from the outside air, the second housing 210 can exchange the air with the space 300 through the second upper-side opening 271 and the second lower-side opening 272.

A wind velocity sensor M1 protrudes leftward from the right side of the second front-side opening 273. This wind velocity sensor M1 measures a wind velocity X21 of the air supplied from the second front-side opening 273. If a cross-sectional area of the second front-side opening 273 is Y21, the volume of air supplied from the second front-side opening 273 is V2=X21×Y21.

A wind velocity sensor M2 protrudes leftward from the right side of the second rear-side opening 274. This wind velocity sensor M2 measures a wind velocity X22 of the air discharged from the second rear-side opening 274. If a cross-sectional area of the second rear-side opening 274 is Y22, a volume of air discharged from the second rear-side opening 274 is v2=X22×Y22.

It is assumed that a volume of air passing from the inside to the outside of the first housing 110 through the first upper-side opening 171 and the first lower-side opening 172 is V'1 [m$^3$/min], and a volume of air passing from the inside to the outside of the second housing 210 through the second upper-side opening 271 and the second lower-side opening 272 is V'2 [m$^3$/min]. Moreover, it is assumed that the sum of the cross-sectional areas of the first upper-side opening 171 and the first lower-side opening 172 is S1 [m$^2$], and the sum of the cross-sectional areas of the second upper-side opening 271 and the second lower-side opening 272 is S2 [m$^2$]. In such a case, a relation of V'1/S1>V'2/S2 is satisfied.

A volume of air of fans is determined by a combination of known factors such as the number of fans, a fan type, a difference in the rotation speed of fan blades, a difference in opening size of air ducts, and a difference in pressure loss in air ducts depending on a difference in the length of air ducts, and can be set as necessary by a designer. Hereinafter, a combination of volumes of supplied and discharged air and the flow of wind will be described.

Case where V1>v1 and V2>v2

FIG. 5 schematically illustrates the volume of air and the flow of wind when V1>v1 and V2>v2.

The flow of air inside and outside the first housing 110 satisfies a relation of V1>v1. Thus, a portion of air supplied from the first front-side opening 173 by the first air supply fan 181 is discharged from the first rear-side opening 174 by the first air discharge fan 182, and the remaining air is discharged to the space 300 open to the atmosphere through the first upper-side opening 171 and the first lower-side opening 172.

The flow of air inside and outside the second housing 210 satisfies a relation of V2>v2. Thus, a portion of the air supplied from the second front-side opening 273 by the second air supply fan 281 is discharged from the second rear-side opening 274 by the second air discharge fan 282, and the remaining air is discharged to the space 300 open to the atmosphere through the second upper-side opening 271 and the second lower-side opening 272.

Thus, the heated air in the second housing 210 having passed through the first and second fixing devices 221 and 222 heated to high temperature in order to fix images is discharged to the air discharged from the first upper-side opening 171 and the first lower-side opening 172. Moreover, the air is discharged to the outside air through the space 300 and the second rear-side opening 274 without entering into the first housing 110.

Further, in this configuration, since the volume of supplied air is set to be very larger than the volume of discharged air, air may be discharged outside the image forming apparatus 1 through an unexpected gap in the first or second housing 110 or 210, but the outside air of the image forming apparatus 1 may not be taken in. Thus, the first front-side opening 173 on the upstream side of the first air supply fan 181 is the only air introduction port of the first housing 110. Moreover, the second front-side opening 273 on the upstream side of the second air supply fan 281 is the only air introduction port of the second housing 210.

Thus, in particular, when the outside air of the image forming apparatus 1 is contaminated with dust, the first dust filter 191 and the second dust filter 291 are provided in the first front-side opening 173 and the second front-side opening 273, respectively. That is, the first dust filter 191 is disposed in the first front-side opening 173 as an air duct of the first air supply fan 181, and the second dust filter 291 is disposed in the second front-side opening 273 as an air duct of the second air supply fan 281. Due to this, it is possible to collect dust in the outside air efficiently. As a result, it is possible to ideally prevent malfunctioning of the image forming apparatus 1 due to dust.

In this embodiment, the conditions V1>v1 and V2>v2 are satisfied in relation to the total amount of the volume of supplied air and the volume of discharged air. Thus, the same is satisfied even when at least one first air supply fans and at least one second air supply fans are provided and further even when the first air discharge fan or the second air discharge fan is not provided.

Fifth Embodiment

Hereinafter, a case where V1<v1 and V2<v2 will be described as a fifth embodiment. The same constituent components as those of the fourth embodiment will be denoted by the same reference numerals, and description thereof will not be provided.

Case where V1<v1 and V2<v2

FIG. 6 schematically illustrates the volume of air and the flow of wind when V1<v1 and V2<v2. In this embodiment, it is also assumed that a volume of air passing from the inside to the outside of the first housing 110 through the first upper-side opening 171 and the first lower-side opening 172 is V'1 [m³/min], and a volume of air passing from the inside to the outside of the second housing 210 through the second upper-side opening 271 and the second lower-side opening 272 is V'2 [m³/min]. Moreover, it is assumed that the sum of the cross-sectional areas of the first upper-side opening 171 and the first lower-side opening 172 is S1 [m²], and the sum of the cross-sectional areas of the second upper-side opening 271 and the second lower-side opening 272 is S2 [m²]. In such a case, a relation of V'1/S1>V'2/S2 is satisfied.

Since the flow of air inside and outside the first housing 110 satisfies a relation of V1<v1, the air supplied from the first front-side opening 173 by the first air supply fan 181 is discharged from the first rear-side opening 174 by the first air discharge fan 182. Further, air is taken in from the space 300 through the first upper-side opening 171 and the first lower-side opening 172 and is discharged from the first rear-side opening 174 by the first air discharge fan 182.

Since the flow of air inside and outside the second housing 210 satisfies a relation of V2<v2, the air supplied from the second front-side opening 273 by the second air supply fan 281 is discharged from the second rear-side opening 274 by the second air discharge fan 282. Further, air is taken in from the space 300 through the second upper-side opening 271 and the second lower-side opening 272 and is discharged from the second rear-side opening 274 by the second air discharge fan 282.

Here, if the volume of air supplied by the second air supply fan 281 is V2 [m³/min], and the volume of air discharged by the second air discharge fan 282 is v2 [m³/min], a relation of V2−v2<0 is satisfied.

Thus, the heated air in the second housing 210 having passed through the first and second fixing devices 221 and 222 heated to high temperature in order to fix images is discharged to the outside air through the second rear-side opening 274 without entering into the first housing 110.

In this configuration, since the volume of discharged air is set to be very larger than the volume of supplied air, the outside air of the image forming apparatus 1 may be taken in through an unexpected gap in the first or second housing 110 or 210, but no air is discharged outside the image forming apparatus 1. Thus, the first rear-side opening 174 is the only air discharge port of the first housing 110. Moreover, the second rear-side opening 274 is the only air discharge port of the second housing 210.

Thus, when VOC, ozone, or the like is generated in the process of image formation and image fixing inside the first and second housings 110 and 210, a first VOC filter 192 and a second VOC filter 292 are provided in the first rear-side opening 174 and the second rear-side opening 274, respectively. That is, the first VOC filter 192 is disposed in the first rear-side opening 174 as an air duct of the first air discharge fan 182, and the second VOC filter 292 is disposed in the second rear-side opening 274 as an air duct of the second air discharge fan 282. Due to this, the air inside the image forming apparatus can be purified efficiently and be discharged outside the apparatus.

In this embodiment, the conditions V1<v1 and V2<v2 are satisfied in relation to the total amount of the volume of supplied air and the volume of discharged air, and the same is satisfied even when the first air supply fan or the second air supply fan is not provided and further even when at least one first air discharge fans and at least one second air discharge fans are provided.

Sixth Embodiment

Hereinafter, a case where V1>v1 and V2<v2 will be described as a sixth embodiment. The same constituent components as those of the fourth embodiment will be denoted by the same reference numerals, and description thereof will not be provided.

Case where V1>v1 and V2<v2

FIG. 7 schematically illustrates the volume of air and the flow of wind when V1>v1 and V2<v2. In this embodiment, it is also assumed that a volume of air passing from the inside to the outside of the first housing 110 through the first upper-side opening 171 and the first lower-side opening 172 is V'1 [m³/min], and a volume of air passing from the inside to the outside of the second housing 210 through the second upper-side opening 271 and the second lower-side opening 272 is V'2 [m³/min]. Moreover, it is assumed that the sum of the cross-sectional areas of the first upper-side opening 171 and the first lower-side opening 172 is S1 [m²], and the sum of the cross-sectional areas of the second upper-side opening 271 and the second lower-side opening 272 is S2 [m²]. In such a case, a relation of V'1/S1>V'2/S2 is satisfied.

The flow of air inside and outside the first housing 110 satisfies a relation of V1>v1. Thus, a portion of air supplied from the first front-side opening 173 by the first air supply fan 181 is discharged from the first rear-side opening 174 by the first air discharge fan 182, and the remaining air is discharged to the space 300 through the first upper-side opening 171 and the first lower-side opening 172.

Since the flow of air inside and outside the second housing 210 satisfies a relation of V2<v2, the air supplied from the second front-side opening 273 by the second air supply fan 281 is discharged from the second rear-side opening 274 by the second air discharge fan 282. Further, air is taken in from the space 300 through the second upper-side opening 271 and the second lower-side opening 272 and is discharged from the second rear-side opening 274 by the second air discharge fan 282.

Here, if the volume of air supplied by the second air supply fan 281 is V2 [m³/min], and the volume of air discharged by the second air discharge fan 282 is v2 [m³/min], a relation of V2−v2<0 is satisfied.

Thus, the heated air in the second housing 210 having passed through the first and second fixing devices 221 and 222 heated to high temperature in order to fix images is discharged to the outside air through the second rear-side opening 274 without entering into the first housing 110.

Further, in this configuration, the first front-side opening 173 is the only air introduction port of the first housing 110. Thus, in particular, when the outside air of the image forming apparatus 1 is contaminated with dust, the first dust filter 191 is provided in the first front-side opening 173 as an air duct of the first air supply fan 181. Due to this, it is possible to collect dust in the outside air efficiently. Moreover, it is possible to ideally prevent malfunctioning of an exposure portion or the like in the first housing 110, which can easily be affected by dust.

Further, in this configuration, the second rear-side opening 274 is the only air discharge port of the second housing 210. Thus, the second VOC filter 292 is disposed in the second rear-side opening 274 as an air duct of the second air discharge fan 282. Due to this, VOC and the like which are often generated near a hot fixing device, in particular, within the air discharged from the second housing 210 can be purified efficiently and be discharged outside the apparatus.

In this embodiment, the conditions V1>v1 and V2<v2 are satisfied in relation to the total amount of the volume of supplied air and the volume of discharged air. Thus, the same is satisfied even when at least one first air supply fans are provided and the second air supply fan is not provided and further even when the first air discharge fan is not provided and at least one second air discharge fans are provided.

The following can be said from those described in the first to third embodiments. When an absolute pressure of a static pressure of an atmospheric pressure is P [Pa (abs)], an absolute pressure of a wind pressure in the first opening (171, 172) of the first housing 110 is P1 [Pa (abs)], and an absolute pressure of a wind pressure in the second opening (271, 272) of the second housing 210 is P2 [Pa (abs)], a condition P2<P1 is satisfied.

The following can be said from those described in the fourth to sixth embodiments. When a volume of air passing from the inside to the outside of the first housing 110 through the first opening (171, 172) is V'1 [m³/min], a volume of air passing from the inside to the outside of the second housing 210 through the second opening (271, 272) is V'2 [m³/min], an area of the first opening is S1 [m²], and an area of the second opening is S2 [m²], a relation of V'1/S1>V'2/S2 is satisfied.

According to any one of the first to sixth embodiments, in a configuration in which the first housing 110 and the second housing 210 are disposed so as to be adjacent to each other, the heat quantity of the air flowing from the second housing 210 to the first housing 110 is reduced, and an increase in the temperature of the components inside the first housing 110 is reduced.

Hereinabove, the first to sixth embodiments when there is a difference in the volume of supplied and discharged air has been described. However, if the pressure inside the housing or the volume of supplied air is controlled so as to approach the pressure of outside air or the volume of discharged air, it is possible to suppress the movement of heat, dust, VOC, and ozone generated with movement of air inside openings other than the openings through which air is supplied and discharged by fans.

Seventh Embodiment

Schematic View of Combined State of Image Forming Apparatus

Figure 8:
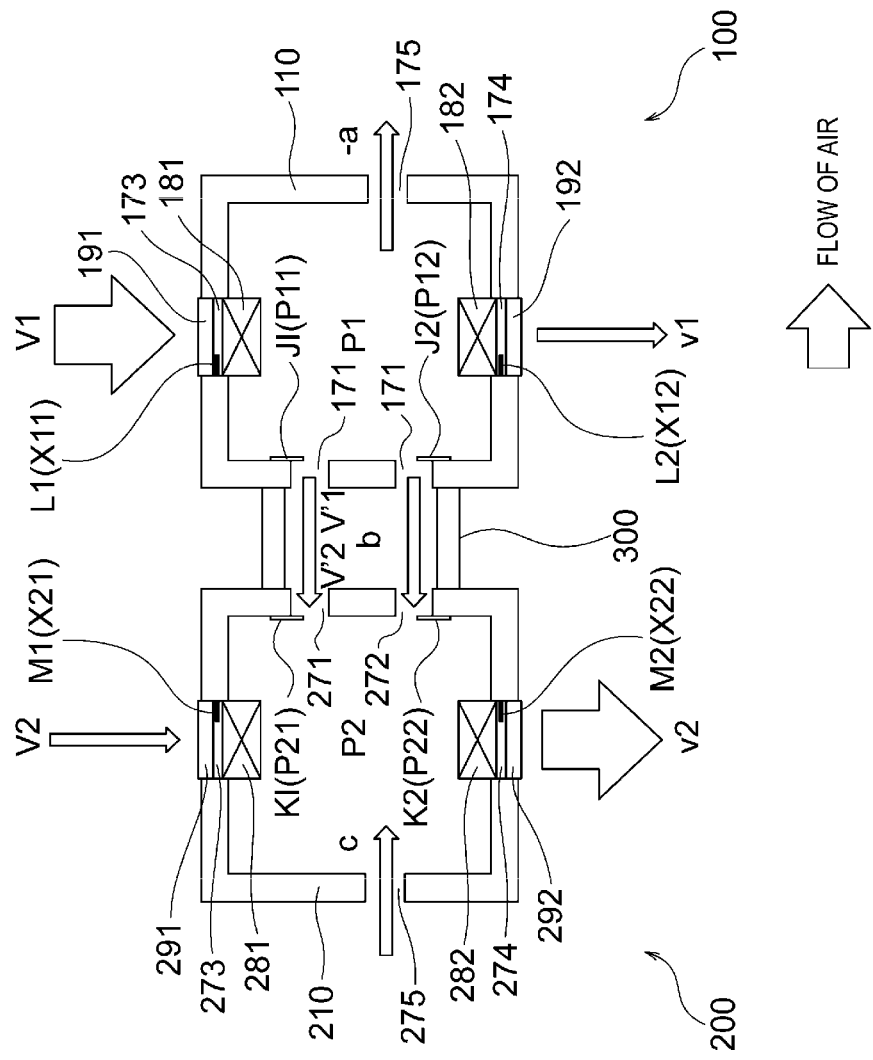
FIG. 8 is a cross-sectional view illustrating steps of cooling the inside of the first and second housing units according to a seventh embodiment.

FIG. 8 is a diagram schematically illustrating configurations associated with cooling of the image forming apparatus 1 in which the first housing unit 100 and the second housing unit 200 are combined. The first housing unit 100 and the second housing unit 200 are positioned by positioning pins (not illustrated) and are arranged close to each other by being fixed by a fixing member (not illustrated).

The first upper-side opening 171 and the first lower-side opening 172 as 'first opening' are formed in a surface of the first housing 110 facing a sealing member 300. Although two openings are formed in this embodiment, at least one openings may be formed. The second upper-side opening 271 and the second lower-side opening 272 as 'second opening' are formed in a surface of the second housing 210 facing the sealing member 300. Although two openings are formed in this embodiment, at least one openings may be formed.

The sealing member 300 is disposed in such a manner of being sandwiched between an outer surface in which the first upper-side opening 171 and the first lower-side opening 172 are formed and an outer surface in which the second upper-side opening 271 and the second lower-side opening 272 are formed. The sealing member 300 as 'communicating portion' is isolated from the atmosphere and communicates between the first housing 110 and the second housing 210. The first and second housings 110 and 210 are configured such that the air therein is not discharged directly to the atmosphere or is not supplied directly from the atmosphere through the first upper-side opening 171, the first lower-side opening 172, the second upper-side opening 271, and the second lower-side opening 272. The air inside the first housing 110 can be exchanged with the air inside the second housing 210.

Further, in a general image forming apparatus, the advantageous effects of the present invention are realized even if a gap of several millimeters is formed in the sealing member 300 and the outer surface (the same is true for the eighth to thirteenth embodiments described later).

The first air supply fan 181 is provided on the inner side of the first front-side opening 173. The first air supply fan 181 as 'first air supply device' (first air supply and discharge device) is provided in the first housing 110 so as to supply air from the outside to the inside of the first housing 110. Pressure [Pa] described hereinafter is a wind pressure or a static pressure and is defined as an absolute pressure based on an absolute vacuum and an atmospheric pressure is defined as P [Pa].

The first air discharge fan 182 is provided on the inner side of the first rear-side opening 174. The first air discharge fan 182 as 'first air discharge device' (first air supply and discharge device) is provided in the first housing 110 so as to discharge air from the inside to the outside of the first housing 110. In this embodiment, although both the first air supply fan 181 and the first air discharge fan 182 are provided, a desired function can be realized as long as at least one of the fans is provided.

A wind pressure can be measured by a wind pressure sensor. Specifically, a wind pressure P1 of air leaking from the inside to the outside of the first opening (171, 172) in the first housing 110 or entering from the outside to the inside of the first opening is measured near the first upper-side opening 171 and the first lower-side opening 172.

The second air supply fan 281 is provided in the second front-side opening 273. The second air supply fan 281 as 'second air supply device' (second air supply and discharge device) is provided in the second housing 210 so as to supply air from the outside to the inside of the second housing 210.

The second air discharge fan 282 is provided in the second rear-side opening 274. The second air discharge fan 282 as 'second air discharge device' (second air supply and discharge device) is provided in the second housing 210 so as to discharge air from the inside to the outside of the second housing 210. The second air discharge fan 282 discharges the air inside the second housing 210 to the outside of the image forming apparatus 1 so that the static pressure in the second housing 210 reaches P2 [Pa]. In this embodiment, although both the second air supply fan 281 and the second air discharge fan 282 are provided, a desired function can be realized as long as at least one of the fans is provided.

A wind pressure P2 of air leaking from the inside to the outside of the second opening (273, 274) in the second housing 210 or entering from the outside to the inside of the second opening is measured near the second upper-side opening 271 and the second lower-side opening 272.

The first air supply fan 181, the first air discharge fan 182, the second air supply fan 281, and the second air discharge fan 282 supply and discharge air so that a relation of P1>P2 is satisfied. Moreover, these fans are set to operate constantly during an image forming operation. Specifically, these fans operate when the first fixing device 221 and the second fixing device 222 start operating. When the first fixing device 221 and the second fixing device 222 stop operating, or when a predetermined period elapses after that, these fans stop. Thus, the fans may operate at least during an image forming operation.

A pressure difference inside and outside the housing due to fans is determined by a combination of known factors such as the number of fans, a fan type, a difference in the rotation speed of fan blades, a difference in opening size of air ducts, and a difference in pressure loss in air ducts depending on a difference in the length of air ducts. These factors can be set as necessary by a designer. Hereinafter, a combination of volumes of supplied and discharged air and the flow of wind will be described.

FIG. 8 schematically illustrates the flow of wind according to this embodiment. In this embodiment, a relation of P1>P2 is satisfied when an absolute pressure of a static pressure of the air inside the first housing 110 is P1 [Pa (abs)] and an absolute pressure of a static pressure of the air inside the second housing 210 is P2 [Pa (abs)]. Since P1>P2, the air inside the first housing 110 flows into the second housing 210 through the first upper-side opening 171, the first lower-side opening 172, the second upper-side opening 271, and the second lower-side opening 272.

The wind pressure sensor J1 protrudes downward from the upper side of the first upper-side opening 171. This wind pressure sensor J1 measures a wind pressure P11 of the air in the first upper-side opening 171 leaking from the first upper-side opening 171. The wind pressure sensor J2 protrudes upward from the lower side of the first lower-side opening 172. This wind pressure sensor J2 measures a wind pressure P12 of the air in the first lower-side opening 172 leaking from the first lower-side opening 172. Thus, the wind pressure of the air leaking in the opening inside the first housing 110 is P1=(P11+P12)/2.

The wind pressure sensor K1 protrudes downward from the upper side of the second upper-side opening 271. This wind pressure sensor K1 measures a wind pressure P21 of the air in the second upper-side opening 271 leaking from the second upper-side opening 271. The wind pressure sensor K2 protrudes upward from the lower side of the second lower-side opening 272. This wind pressure sensor K2 measures a wind pressure P22 of the air in the second lower-side opening 272 leaking from the second lower-side opening 272. Thus, the wind pressure of the air leaking in the opening inside the second housing 210 is P2=(P21+P22)/2.

Thus, the heated air in the second housing 210 having passed through the first and second fixing devices 221 and 222 heated to high temperature in order to fix images is discharged to the outside air through the second rear-side opening 274 without entering into the first housing 110.

In this embodiment, the pressure inside a housing may be different from the pressure outside the housing. Further, when a first opening 175 or a second opening 275 is formed in the first housing 110 or the second housing 210 as an unexpected gap, the air inside the image forming apparatus 1 may flow outside, and conversely, the air outside the image forming apparatus 1 may flow therein. However, as described above, the pressure in the first housing 110 and the pressure inside the second housing 210 maintain a relation of P1>P2. Due to this, at least the air inside the second housing 210 may not flow into the first housing 110, and as a result, the heated air inside the second housing 210 may not flow into the first housing 110.

In this embodiment, the pressure relation of P1>P2 is satisfied, and at least one of the first air supply fan, second air supply fan, first air discharge fan, and second air discharge fan may not be used unlike the above description.

Eighth Embodiment

Hereinafter, a case where P>P1>P2 will be described as an eighth embodiment. In order words, this embodiment is a case where P1<P, P2<P, and P1>P2 when an absolute pressure of a static pressure of an atmospheric pressure is P [Pa (abs)]. The same constituent components as those of the seventh embodiment will be denoted by the same reference numerals, and description thereof will not be provided.

(Case where P>P1>P2)

Figure 9:
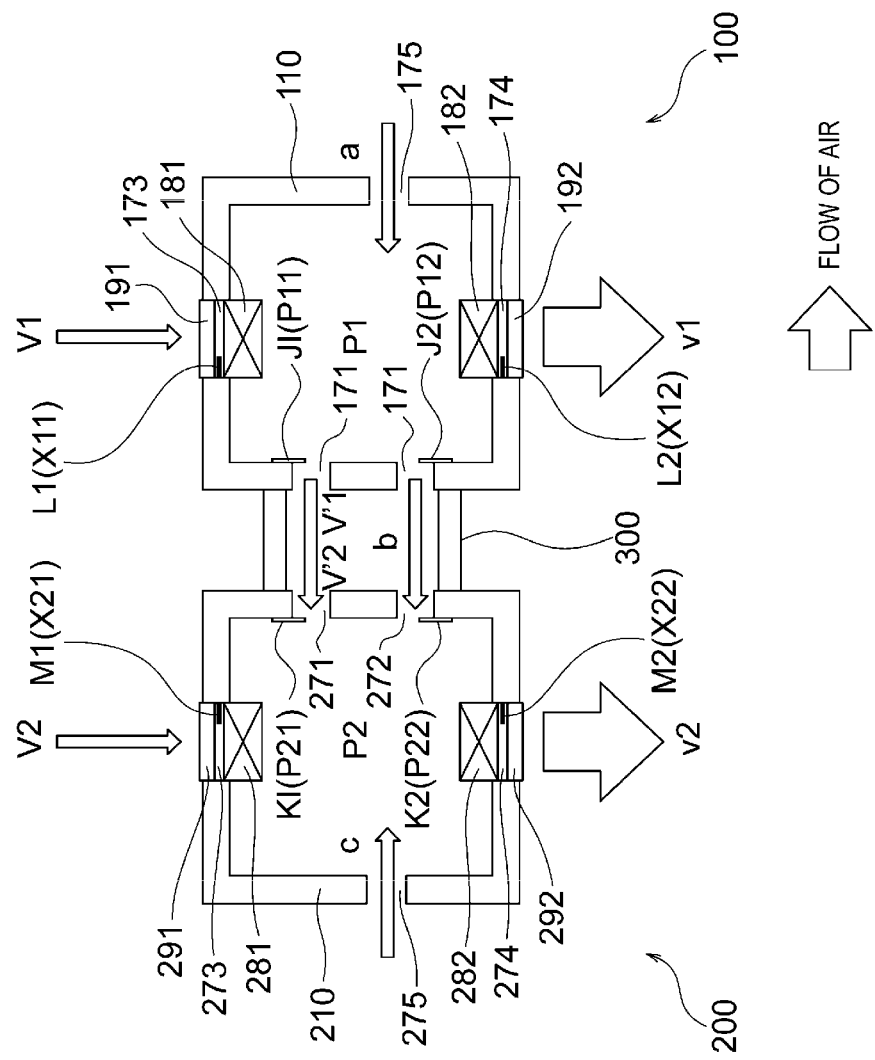
FIG. 9 is a cross-sectional view illustrating steps of cooling the inside of the first and second housing units according to an eighth embodiment.

FIG. 9 schematically illustrates the flow of wind according to this embodiment. Since P1>P2, the air inside the first housing 110 flows into the second housing 210 through the first upper-side opening 171, the first lower-side opening 172, the second upper-side opening 271, and the second lower-side opening 272.

Thus, the heated air in the second housing 210 having passed through the first and second fixing devices 221 and 222 heated to high temperature in order to fix images is discharged to the outside air through the second rear-side opening 274 without entering into the first housing 110.

Further, since P1<P, the air outside the image forming apparatus 1 flows into the first housing 110 through the first opening 175. Strictly speaking, the wind pressure P1 when this flow occurs is the pressure measured near the first opening 175 in the first housing 110. Thus, although the pressure measured near the first upper-side opening 171 may be different from the pressure measured near the first lower-side opening 172, the condition P>P1>P2 is satisfied.

Similarly, since P2<P, the air outside the image forming apparatus 1 flows into the second housing 210 through the second opening 275. Strictly speaking, the pressure P2 when this flow occurs is the pressure measured near the second opening 275 in the second housing 210. Thus, although the pre measured near the second upper-side opening 271 may be different from the pressure measured near the second lower-side opening 272, the condition P>P1>P2 is satisfied.

Therefore, in this embodiment, although an unexpected gap is formed in the first housing 110 or the second housing 210, the outside air of the image forming apparatus 1 may be taken in through the gap, but no air is discharged outside the image forming apparatus 1. Thus, the first rear-side opening 174 is the only air discharge port of the first housing 110. Similarly, the second rear-side opening 274 is the only air discharge port of the second housing 210.

Thus, when VOC, ozone, or the like is generated in the process of image formation and image fixing inside the first and second housings 110 and 210, the first VOC filter 192 and the second VOC filter 292 are provided in the first rear-side opening 174 and the second rear-side opening 274, respectively. That is, the first VOC filter 192 is disposed in the first rear-side opening 174 as an air duct of the first air discharge fan 182, and the second VOC filter 292 is disposed in the second rear-side opening 274 as an air duct of the second air discharge fan 282. Due to this, the air inside the image forming apparatus 1 can be purified efficiently and be discharged outside the apparatus.

In this embodiment, the pressure relation P>P1>P2 is satisfied, and the same is satisfied even when the first air supply fan or the second air supply fan is not provided, at least one first air discharge fans, and at least one second air discharge fans are provided.

Ninth Embodiment

Hereinafter, a case where P1>P2>P will be described as a ninth embodiment. In order words, this embodiment is a case where P1>P, P2>P, and P1>P2 when an absolute pressure of a static pressure of an atmospheric pressure is P [Pa (abs)]. The same constituent components as those of the seventh embodiment will be denoted by the same reference numerals, and description thereof will not be provided.
(Case where P1>P2>P)

Figure 10:
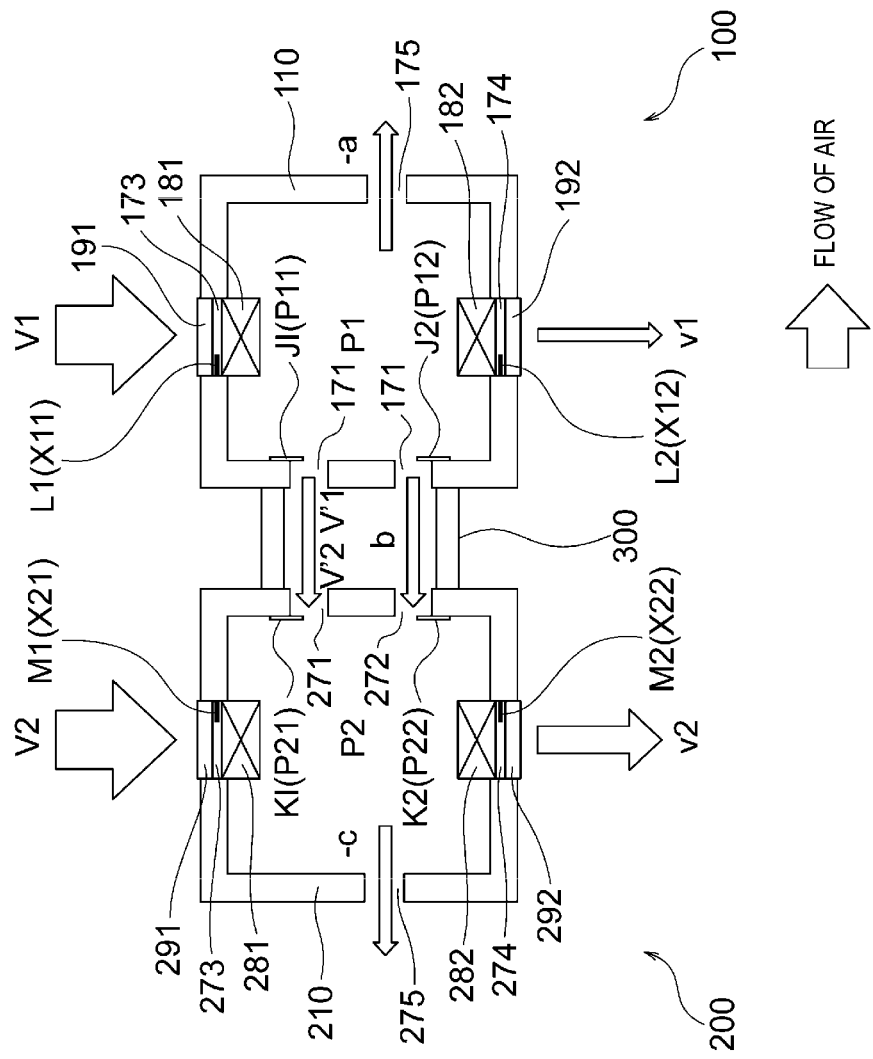
FIG. 10 is a cross-sectional view illustrating steps of cooling the inside of the first and second housing units according to a ninth embodiment.

FIG. 10 schematically illustrates the flow of wind according to this embodiment.

Since P1>P2, the air inside the first housing 110 flows into the second housing 210 through the first upper-side opening 171, the first lower-side opening 172, the second upper-side opening 271, and the second lower-side opening 272.

Thus, the heated air in the second housing 210 having passed through the first and second fixing devices 221 and 222 heated to high temperature in order to fix images is discharged to the outside air through the second rear-side opening 274 without entering into the first housing 110.

Further, since P1>P, the air inside the first housing 110 flows outside the image forming apparatus 1 through the first opening 175. Strictly speaking, the wind pressure P1 when this flow occurs is the pressure measured near the first opening 175 in the first housing 110. Thus, although the pressure measured near the first upper-side opening 171 may be different from the pressure measured near the first lower-side opening 172, the condition P1>P2>P is satisfied.

Similarly, since P2>P, the air inside the second housing 210 flows outside the image forming apparatus 1 through the second opening 275. Strictly speaking, the pressure P2 when this flow occurs is the pressure measured near the second opening 275 in the second housing 210. Thus, although the pre measured near the second upper-side opening 271 may be different from the pressure measured near the second lower-side opening 272, the condition P1>P2>P is satisfied.

Therefore, in this embodiment, although an unexpected gap is formed in the first housing 110 or the second housing 210, the outside air of the image forming apparatus 1 may not flow into the image forming apparatus through the gap. Thus, the first front-side opening 173 is the only air introduction port of the first housing 110. Similarly, the second front-side opening 273 is the only air introduction port of the second housing 210.

Thus, in particular, when the outside air of the image forming apparatus 1 is contaminated with dust, the first dust filter 191 and the second dust filter 291 are provided in the first front-side opening 173 and the second front-side opening 273, respectively. That is, the first dust filter 191 is disposed in the first front-side opening 173 as an air duct of the first air supply fan 181, and the second dust filter 291 is disposed in the second front-side opening 273 as an air duct of the second air supply fan 281. Due to this, it is possible to collect dust in the outside air efficiently. As a result, it is possible to ideally prevent malfunctioning of the image forming apparatus 1 due to dust.

In this embodiment, the pressure relation P1>P2>P is satisfied, and the same is satisfied even when at least one first air supply fans and at least one second air supply fan are provided and further even when the first air discharge fan or the second air discharge fan is not provided.

Tenth Embodiment

Hereinafter, a case where P1>P>P2 will be described as a tenth embodiment. In order words, this embodiment is a case where P1>P and P2<P when an absolute pressure of a static pressure of an atmospheric pressure is P [Pa (abs)]. The same constituent components as those of the seventh embodiment will be denoted by the same reference numerals, and description thereof will not be provided.
(Case where P1>P>P2)

FIG. 8 schematically illustrates the flow of wind according to this embodiment.

Since P1>P2, the air inside the first housing 110 flows into the second housing 210 through the first upper-side opening 171, the first lower-side opening 172, the second upper-side opening 271, and the second lower-side opening 272.

Thus, the heated air in the second housing 210 having passed through the first and second fixing devices 221 and 222 heated to high temperature in order to fix images is discharged to the outside air through the second rear-side opening 274 without entering into the first housing 110.

Further, since P1>P, the air inside the first housing 110 flows outside the image forming apparatus 1 through the first opening 175. Strictly speaking, the wind pressure P1 when this flow occurs is the pressure measured near the first opening 175 in the first housing 110. Thus, although the pressure measured near the first upper-side opening 171 may be different from the pressure measured near the first lower-side opening 172, the condition P1>P>P2 is satisfied.

Since P2<P, the air outside the image forming apparatus 1 flows into the second housing 210 through the second opening 275. Strictly speaking, the pressure P2 when this flow occurs is the pressure measured near the second opening 275 in the second housing 210. Thus, although the pre measured near the second upper-side opening 271 may be different from the pressure measured near the second lower-side opening 272, the condition P1>P>P2 is satisfied.

Thus, in this embodiment, the first front-side opening 173 is the only air introduction port of the first housing 110. Thus, in particular, when the outside air of the image forming apparatus 1 is contaminated with dust, the first dust filter 191 is provided in the first front-side opening 173 as an air duct of the first air supply fan 181. Due to this, it is possible to collect dust in the outside air efficiently. Moreover, it is possible to ideally prevent malfunctioning of an exposure portion or the like in the first housing 110, which can easily be affected by dust.

Further, in this embodiment, the second rear-side opening 274 is the only air discharge port of the second housing 210. Thus, the second VOC filter 292 is disposed in the second rear-side opening 274 as an air duct of the second air discharge fan 282. Due to this, VOC and the like which are often generated near a hot fixing device, in particular, within the air discharged from the second housing 210 can be purified efficiently and be discharged outside the apparatus.

In this embodiment, the pressure relation P1>P>P2 is maintained, and the same is satisfied even when at least one first air supply fans are provided, the second air supply fan is not provided, the first air discharge fan is not provided, and at least one second air discharge fans are provided.

Hereinabove, the seventh to tenth embodiments have been described for a case where the pressure inside the apparatus having a plurality of housings is different from the pressure outside the apparatus. However, if the pressure difference can be decreased, it is possible to suppress the movement of heat, dust, VOC, and ozone generated with movement of air inside openings other than the openings through which air is supplied and discharged by fans.

Eleventh Embodiment

Hereinafter, an eleventh embodiment will be described with reference to FIG. 8. The same constituent components as those of the seventh embodiment will be denoted by the same reference numerals, and description thereof will not be provided.

The first air supply fan 181 is provided on the inner side of the first front-side opening 173 so as to supply the outside air of the image forming apparatus 1 into the first housing 110 with a volume of air V1 [$m^3$/min]. The first air discharge fan 182 is provided on the inner side of the first rear-side opening 174 so as to discharge the air inside the first housing 110 to the outside of the image forming apparatus 1 with a volume of air v1 [$m^3$/min].

The second air supply fan 281 is provided on the inner side of the second front-side opening 273 so as to supply the outside air of the image forming apparatus 1 into the second housing 210 with a volume of air V2 [$m^3$/min]. The second air discharge fan 282 is provided on the inner side of the second rear-side opening 274 so as to discharge the air inside the second housing 210 to the outside of the image forming apparatus 1 with a volume of air v2 [$m^3$/min].

The volumes of air V1, v1, V2, and v2 are set to be larger than 0. A volume of air of fans is determined by a combination of known factors such as the number of fans, a fan type, a difference in the rotation speed of fan blades, a difference in opening size of air ducts, and a difference in pressure loss in air ducts depending on a difference in the length of air ducts, and can be set as necessary by a designer.

Here, it is assumed that a volume of outside air flowing into the first housing 110 through the first opening 175 is a [$m^3$/min] ("−a" when the air flows outside). A volume of air inside the first housing 110 flowing into the second housing 210 through the first upper-side opening 171 and the first lower-side opening 172 is b [$m^3$/min]. A volume of outside air flowing into the second housing 210 through the second opening 275 is c [$m^3$/min]. Although the volume of air a or c is defined assuming that an unexpected gap is formed in a housing, the volume of air a or c may be regarded as 0 if no gap is formed.

The volumes of air a, b, and c are determined by the volumes of air V1, v1, V2, and v2 and a pressure loss in the opening. The pressure loss is determined by known factors such as an air duct shape, an opening area of an air duct, and an air duct length and can be set as necessary by a designer.
(Case where V1−v1+a>V2−v2+c)

In this embodiment, the respective volumes of air are set so as to satisfy a relation of V1−v1+a>V2−v2+c so that a relation of V1−v1>V2−v2 is satisfied. That is, a total volume of air flowing into the first housing 110 is set to be larger than a total volume of air flowing into the second housing 210, or a total volume of air flowing out of the first housing 110 is set to be smaller than a total volume of air flowing out of the second housing 210.

Since the amount of the entire air entering and exiting the image forming apparatus is preserved, the air inside the first housing 110 flows into the second housing 210 through the first upper-side opening 171, the first lower-side opening 172, the second upper-side opening 271, and the second lower-side opening 272. Thus, the heated air in the second housing 210 having passed through the first and second fixing devices 221 and 222 heated to high temperature in order to fix images is discharged to the outside air through the second rear-side opening 274 without entering into the first housing 110.

Here, it is assumed that a volume of air passing from the inside to the outside of the first housing 110 through the first upper-side opening 171 and the first lower-side opening 172 is V'1 [$m^3$/min], and a volume of air passing from the inside to the outside of the second housing 210 through the second upper-side opening 271 and the second lower-side opening 272 is V'2 [$m^3$/min]. Moreover, it is assumed that the sum of the cross-sectional areas of the first upper-side opening 171 and the first lower-side opening 172 is S1 [$m^2$], and the sum of the cross-sectional areas of the second upper-side opening 271 and the second lower-side opening 272 is S2 [$m^2$]. In such a case, a relation of V'1/S1>V'2/S2 is satisfied.

In this embodiment, the volumes of air maintain the relation of V1−v1+a>V2−v2+c, and at least one of the first air supply fan, second air supply fan, first air discharge fan, and second air discharge fan may not be used unlike the above description.

Twelfth Embodiment

Hereinafter, a twelfth embodiment will be described with reference to FIG. 9. The same constituent components as those of the eleventh embodiment will be denoted by the same reference numerals, and description thereof will not be provided.

In this embodiment, the volumes of air are set so as to satisfy a relation of V1−v1+a>V2−v2+c similarly to the eleventh embodiment, and the air inside the first housing 110 flows into the second housing 210 through the first upper-side opening 171, the first lower-side opening 172, the second upper-side opening 271, and the second lower-side opening 272. Thus, the heated air in the second housing 210 having passed through the first and second fixing devices 221 and 222 heated to high temperature in order to fix images is discharged to the outside air through the second rear-side opening 274 without entering into the first housing 110.
(Case where V1<v1 and V2<v2)

In this embodiment, the respective volumes of air are set so as to satisfy relations of V1<v1 and V2<v2. That is, the volume of discharged air is set to be larger than the volume of supplied air. Thus, although an unexpected gap is formed in the first housing 110 or the second housing 210, the outside air of the image forming apparatus 1 may be taken in through the gap, but no air is discharged outside the image forming apparatus 1. Thus, the first rear-side opening 174 is the only air discharge port of the first housing 110. Similarly, the second rear-side opening 274 is the only air discharge port of the second housing 210.

Thus, when VOC, ozone, or the like is generated in the process of image formation and image fixing inside the first and second housings 110 and 210, the first VOC filter 192 and the second VOC filter 292 are provided in the first rear-side opening 174 and the second rear-side opening 274, respectively. That is, the first VOC filter 192 is disposed in the first rear-side opening 174 as an air duct of the first air discharge fan 182, and the second VOC filter 292 is disposed in the second rear-side opening 274 as an air duct of the second air discharge fan 282. Due to this, the air inside the image forming apparatus 1 can be purified efficiently and be discharged outside the apparatus.

In this embodiment, the volumes of air satisfy the relations of V1<v1 and V2<v2, and the same is satisfied even when the first air supply fan or the second air supply fan is not provided, at least one first air discharge fans, and at least one second air discharge fans are provided.

Thirteenth Embodiment

Hereinafter, a thirteenth embodiment will be described with reference to FIG. 10. The same constituent components as those of the sixth and eleventh embodiments will be denoted by the same reference numerals, and description thereof will not be provided.
(Case where V1>v1 and V2>v2)

In this embodiment, the respective volumes of air are set so as to satisfy the relations of V1>v1 and V2>v2. That is, since the volume of supplied air is set to be larger than the volume of discharged air, air may be discharged outside the image forming apparatus 1 through an unexpected gap in the first or second housing 110 or 210, but the outside air of the image forming apparatus 1 may not be taken in. The first front-side opening 173 is the only air introduction port of the first housing 110. Similarly, the second front-side opening 273 is the only air introduction port of the second housing 210.

Thus, in particular, when the outside air of the image forming apparatus 1 is contaminated with dust, a first dust filter 191 and a second dust filter 291 are provided in the first front-side opening 173 and the second front-side opening 273, respectively. That is, the first dust filter 191 is disposed in the first front-side opening 173 as an air duct of the first air supply fan 181, and the second dust filter 291 is disposed in the second front-side opening 273 as an air duct of the second air supply fan 281. Due to this, it is possible to collect dust in the outside air efficiently and to ideally prevent malfunctioning of the image forming apparatus 1 due to dust.

In this embodiment, the volumes of air maintain the relation of V1>v1 and V2>v2, and the same is satisfied even when at least one first air supply fans are provided, at least one second air supply fans are provided, and the first air discharge fan or the second air discharge fan is not provided.

According to any one of the seventh to thirteenth embodiments, in a configuration in which the first housing 110 and the second housing 210 are disposed so as to be adjacent to each other, the heat quantity of the air flowing from the second housing 210 to the first housing 110 is reduced, and an increase in the temperature of the components inside the first housing 110 is reduced.

According to the present invention, in a configuration in which a first housing and a second housing are disposed so as to be adjacent to each other, the heat quantity of the air flowing from the second housing to the first housing is reduced, and an increase in the temperature of the components inside the first housing is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-247039, filed Nov. 29, 2013, and No. 2013-247040, filed Nov. 29, 2013, which are hereby incorporated by reference herein in their entirety.

What is claimed is:

1. An image forming apparatus comprising:
   an image forming portion configured to form an image on a recording material;
   a first housing configured to cover the image forming portion;
   an image heating device configured to heat the image formed on the recording material;
   a second housing, disposed to face the first housing outside of the first housing, configured to cover the image heating device;
   a first opening, provided on the first housing, configured to convey the recording material from the first housing to the second housing;
   a second opening provided on the second housing so as to face the first opening, configured to convey the recording material from the first housing to the second housing;
   a first air blowing device including at least one of a first air supply device that is provided in the first housing so as to supply air into the first housing from the outside of the first housing and a first air discharge device that is provided in the first housing so as to discharge air from an inside of the first housing to the outside; and
   a second air blowing device including at least one of a second air supply device that is provided in the second housing so as to supply air into the second housing from the outside of the second housing and a second air discharge device that is provided in the second housing so as to discharge air from an inside of the second housing to the outside,
   wherein the first housing and the second housing communicate with the atmosphere through the first and second openings, respectively, and
   wherein when the absolute pressure of wind pressure of air in the first opening of the first housing is P1 [Pa (abs)] and the absolute pressure of wind pressure of air in the second opening of the second housing is P2 [Pa (abs)], a relation of P2<P1 is satisfied at least during an image forming operation.

2. The image forming apparatus according to claim 1, wherein when the absolute pressure of the static pressure of atmospheric pressure is P [Pa (abs)], the absolute pressure of wind pressure of air in the first opening of the first housing is P1 [Pa (abs)], and the absolute pressure of wind pressure of air in the second opening of the second housing is P2 [Pa (abs)], relations of P1<P and P2<P are satisfied at least during an image forming operation.

3. The image forming apparatus according to claim 2, wherein a filter is disposed in an air duct of the first air discharge device and a filter is disposed in an air duct of the second air discharge device.

4. The image forming apparatus according to claim 1, wherein when the absolute pressure of the static pressure of atmospheric pressure is P [Pa (abs)], the absolute pressure of wind pressure of air in the first opening of the first housing is P1 [Pa (abs)], and the absolute pressure of wind pressure of air in the second opening of the second housing is P2 [Pa (abs)], relations of P1>P and P2<P are satisfied at least during an image forming operation.

5. The image forming apparatus according to claim 4, wherein a filter is disposed in an air duct of the first air supply device and a filter is disposed in an air duct of the second air supply device.

6. An image forming apparatus comprising:
an image forming portion configured to form an image on a recording material;
a first housing configured to cover the image forming portion;
an image heating device configured to heat the image formed on the recording material;
a second housing, disposed to face the first housing outside of the first housing, configured to cover the image heating device;
a first opening, provided on the first housing, configured to convey the recording material from the first housing to the second housing;
a second opening provided on the second housing so as to face the first opening, configured to convey the recording material from the first housing to the second housing;
a first air blowing device including at least one of a first air supply device that is provided in the first housing so as to supply air into the first housing from the outside of the first housing and a first air discharge device that is provided in the first housing so as to discharge air from an inside of the first housing to the outside; and
a second air blowing device including at least one of a second air supply device that is provided in the second housing so as to supply air into the second housing from the outside of the second housing and a second air discharge device that is provided in the second housing so as to discharge air from an inside of the second housing to the outside,
wherein the first housing and the second housing communicate with the atmosphere through the first and second openings, respectively, and
wherein when the absolute pressure of the static pressure of atmospheric pressure is P [Pa (abs)] and the absolute pressure of wind pressure of air in the second opening of the second housing is P2 [Pa (abs)], a relation of P2<P is satisfied at least during an image forming operation.

7. The image forming apparatus according to claim 6, wherein when the absolute pressure of the static pressure of atmospheric pressure is P [Pa (abs)], the absolute pressure of wind pressure of air in the first opening of the first housing is P1 [Pa (abs)], and the absolute pressure of wind pressure of air in the second opening of the second housing is P2 [Pa (abs)], relations of P1<P and P2<P are satisfied at least during an image forming operation.

8. The image forming apparatus according to claim 7, wherein a filter is disposed in an air duct of the first air discharge device and a filter is disposed in an air duct of the second air discharge device.

9. The image forming apparatus according to claim 6, wherein when the absolute pressure of the static pressure of atmospheric pressure is P [Pa (abs)], the absolute pressure of wind pressure of air in the first opening of the first housing is P1 [Pa (abs)], and the absolute pressure of wind pressure of air in the second opening of the second housing is P2 [Pa (abs)], relations of P1>P and P2<P are satisfied at least during an image forming operation.

10. The image forming apparatus according to claim 9, wherein a filter is disposed in an air duct of the first air supply device and a filter is disposed in an air duct of the second air supply device.

11. An image forming apparatus comprising:
an image forming portion configured to form an image on a recording material;
a first housing configured to cover the image forming portion;
an image heating device configured to heat the image formed on the recording material;
a second housing, disposed to face the first housing outside of the first housing, configured to cover the image heating device;
a first opening, provided on the first housing, configured to convey the recording material from the first housing to the second housing;
a second opening provided on the second housing so as to face the first opening, configured to convey the recording material from the first housing to the second housing;
a first air blowing device including at least one of a first air supply device that is provided in the first housing so as to supply air into the first housing from the outside of the first housing and a first air discharge device that is provided in the first housing so as to discharge air from an inside of the first housing to the outside; and
a second air blowing device including at least one of a second air supply device that is provided in the second housing so as to supply air into the second housing from the outside of the second housing and a second air discharge device that is provided in the second housing so as to discharge air from an inside of the second housing to the outside,
wherein the first housing and the second housing communicate with the atmosphere through the first and second openings, respectively, and
wherein when the volume of air passing through the first opening from the inside to the outside of the first housing is V'1 [$m^3$/min], the volume of air passing through the second opening from the inside to the outside of the second housing is V'2 [$m^3$/min], the area of the first opening is S1 [$m^2$], and the area of the second opening is S2 [$m^2$], relations of V'1/S1>V'2/S2 are satisfied at least during an image forming operation.

12. The image forming apparatus according to claim 11, wherein when the volume of air supplied by the first air supply device is V1 [$m^3$/min], the volume of air discharged by the first air discharge device is v1 [$m^3$/min], the volume of air supplied by the second air supply device is V2 [$m^3$/min], and the volume of air discharged by the second air discharge device is v2 [$m^3$/min], the relations of V1>v1 and V2>v2 are satisfied.

13. The image forming apparatus according to claim 12, wherein a filter is disposed in an air duct of the first air supply device and a filter is disposed in an air duct of the second air supply device.

14. The image forming apparatus according to claim 11, wherein when the volume of air supplied by the first air supply device is V1 [m³/min], the volume of air discharged by the first air discharge device is v1 [m³/min], the volume of air supplied by the second air supply device is V2 [m³/min], and the volume of air discharged by the second air discharge device is v2 [m³/min], the relations of V1<v1 and V2<v2 are satisfied.

15. The image forming apparatus according to claim 14, wherein a filter is disposed in an air duct of the first air discharge device and a filter is disposed in an air duct of the second air discharge device.

16. The image forming apparatus according to claim 11, wherein when the volume of air supplied by the first air supply device is V1 [m³/min], the volume of air discharged by the first air discharge device is v1 [m³/min], the volume of air supplied by the second air supply device is V2 [m³/min], and the volume of air discharged by the second air discharge device is v2 [m³/min], the relations of V1>v1 and V2<v2 are satisfied.

17. The image forming apparatus according to claim 16, wherein a filter is disposed in an air duct of the first air supply device and a filter is disposed in an air duct of the second air discharge device.

18. An image forming apparatus comprising:
an image forming portion configured to form an image on a recording material;
a first housing configured to cover the image forming portion;
an image heating device configured to heat the image formed on the recording material;
a second housing, disposed to face the first housing at outward of the first housing, configured to cover the image heating device;
a first opening, provided on the first housing, configured to convey the recording material from the first housing to the second housing;
a second opening provided on the second housing so as to face the first opening, configured to convey the recording material from the first housing to the second housing;
a first air blowing device including at least one of a first air supply device that is provided in the first housing so as to supply air into the first housing from the outside of the first housing and a first air discharge device that is provided in the first housing so as to discharge air from an inside of the first housing to the outside; and
a second air blowing device including at least one of a second air supply device that is provided in the second housing so as to supply air into the second housing from the outside of the second housing and a second air discharge device that is provided in the second housing so as to discharge air from an inside of the second housing to the outside,
wherein the first housing and the second housing communicate with the atmosphere through the first and second openings, respectively, and
wherein when the volume of air supplied by the second air supply device is V2 [m³/min] and the volume of air discharged by the second air discharge device is v2 [m³/min], a relation of V2−v2<0 is satisfied.

19. The image forming apparatus according to claim 18, wherein when the volume of air supplied by the first air supply device is V1 [m³/min], the volume of air discharged by the first air discharge device is v1 [m³/min], the volume of air supplied by the second air supply device is V2 [m³/min], and the volume of air discharged by the second air discharge device is v2 [m³/min], the relations of V1<v1 and V2<v2 are satisfied.

20. The image forming apparatus according to claim 19, wherein a filter is disposed in an air duct of the first air discharge device and a filter is disposed in an air duct of the second air discharge device.

21. The image forming apparatus according to claim 18, wherein when the volume of air supplied by the first air supply device is V1 [m³/min], the volume of air discharged by the first air discharge device is v1 [m³/min], the volume of air supplied by the second air supply device is V2 [m³/min], and the volume of air discharged by the second air discharge device is v2 [m³/min], the relations of V1>v1 and V2<v2 are satisfied.

22. The image forming apparatus according to claim 21, wherein a filter is disposed in an air duct of the first air supply device and a filter is disposed in an air duct of the second air discharge device.

23. An image forming apparatus comprising:
an image forming portion configured to form an image on a recording material;
a first housing configured to cover the image forming portion;
an image heating device configured to heat the image formed on the recording material;
a second housing, disposed to face the first housing outside of the first housing, configured to cover the image heating device;
a first opening, provided on the first housing, configured to convey the recording material from the first housing to the second housing;
a second opening provided on the second housing so as to face the first opening, configured to convey the recording material from the first housing to the second housing;
a first air blowing device including at least one of a first air supply device that is provided in the first housing so as to supply air into the first housing from the outside and a first air discharge device that is provided in the first housing so as to discharge air from an inside of the first housing to the outside;
a second air blowing device including at least one of a second air supply device that is provided in the second housing so as to supply air into the second housing from the outside and a second air discharge device that is provided in the second housing so as to discharge air from an inside of the second housing to the outside;
a connection cover which surrounds the first opening and the second opening, and forms a space opening between the first opening and the second opening; and
wherein when the absolute pressure of wind pressure of air in the first opening of the first housing is P1 [Pa (abs)] and the absolute pressure of wind pressure of air in the second opening of the second housing is P2 [Pa (abs)], the relation of P1>P2 is satisfied at least during an image forming operation.

24. The image forming apparatus according to claim 23, wherein when the absolute pressure of the static pressure of the atmospheric pressure is P [Pa (abs)], the relations of P1<P and P2<P are satisfied at least during an image forming operation.

25. The image forming apparatus according to claim 24, wherein a filter is disposed in an air duct of the first air discharge device and a filter is disposed in an air duct of the second air discharge device.

26. The image forming apparatus according to claim 23, wherein when the absolute pressure of the static pressure of atmospheric pressure is P [Pa (abs)], the relations of P1>P and P2>P are satisfied at least during an image forming operation.

27. The image forming apparatus according to claim 26, wherein a filter is disposed in an air duct of the first air supply device and a filter is disposed in an air duct of the second air supply device.

28. The image forming apparatus according to claim 23, wherein when the absolute pressure of the static pressure of atmosphere is P [Pa (abs)], the relations of P1>P and P2<P are satisfied at least during an image forming operation.

29. The image forming apparatus according to claim 28, wherein a filter is disposed in an air duct of the first air supply device and a filter is disposed in an air duct of the second air discharge device.

30. An image forming apparatus comprising:
- an image forming portion configured to form an image on a recording material;
- a first housing configured to cover the image forming portion;
- an image heating device configured to heat the image formed on the recording material;
- a second housing, disposed to face the first housing outside of the first housing, configured to cover the image heating device;
- a first opening, provided on the first housing, configured to convey the recording material from the first housing to the second housing;
- a second opening provided on the second housing so as to face the first opening, configured to convey the recording material from the first housing to the second housing;
- a first air blowing device including at least one of a first air supply device that is provided in the first housing so as to supply air into the first housing from the outside and a first air discharge device that is provided in the first housing so as to discharge air from an inside of the first housing to the outside;
- a second air blowing device including at least one of a second air supply device that is provided in the second housing so as to supply air into the second housing from the outside and a second air discharge device that is provided in the second housing so as to discharge air from an inside of the second housing to the outside;
- a connection cover which surrounds the first opening and the second opening, and forms a space opening between the first opening and the second opening; and
- wherein when the volume of air passing through the first opening from the inside to the outside is V'1 [m$^3$/min], the volume of air passing through the second opening from the inside to the outside is V'2 [m$^3$/min], the area of the first opening is S1 [m$^2$], and the area of the second opening is S2 [m$^2$], the relation of V'1/S1>V'2/S2 is satisfied at least during an image forming operation.

31. The image forming apparatus according to claim 30, wherein when the volume of air supplied by the first air supply device is V1 [m$^3$/min], the volume of air discharged by the first air discharge device is v1 [m$^3$/min], the volume of air supplied by the second air supply device is V2 [m$^3$/min], and the volume of air discharged by the second air discharge device is v2 [m$^3$/min], the relations of V1<v1 and V2<v2 are satisfied.

32. The image forming apparatus according to claim 31, wherein a filter is disposed in an air duct of the first air discharge device and a filter is disposed in an air duct of the second air discharge device.

33. The image forming apparatus according to claim 30, wherein when the volume of air supplied by the first air supply device is V1 [m$^3$/min], the volume of air discharged by the first air discharge device is v1 [m$^3$/min], the volume of air supplied by the second air supply device is V2 [m$^3$/min], and the volume of air discharged by the second air discharge device is v2 [m$^3$/min], the relations of V1>v1 and V2>v2 are satisfied.

34. The image forming apparatus according to claim 33, wherein a filter is disposed in an air duct of the first air supply device and a filter is disposed in an air duct of the second air supply device.

* * * * *